(12) United States Patent
Nagatomi et al.

(10) Patent No.: US 7,990,835 B2
(45) Date of Patent: *Aug. 2, 2011

(54) OPTICAL PICKUP APPARATUS, FOCAL-POINT ADJUSTING METHOD, AND OPTICAL DISC APPARATUS

(75) Inventors: Kenji Nagatomi, Kaizu (JP); Katsutoshi Hibino, Kaidu (JP); Seiichiro Takahashi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 102 days.

This patent is subject to a terminal disclaimer.

(21) Appl. No.: 12/512,440

(22) Filed: Jul. 30, 2009

(65) Prior Publication Data

US 2010/0027405 A1     Feb. 4, 2010

(30) Foreign Application Priority Data

Aug. 1, 2008   (JP) ................................. 2008-200264

(51) Int. Cl.
   *G11B 7/00*   (2006.01)
(52) U.S. Cl. ........... 369/112.19; 369/112.12; 369/44.23; 369/112.03; 369/44.42
(58) Field of Classification Search ............. 369/112.19, 369/112.12
See application file for complete search history.

(56) References Cited

U.S. PATENT DOCUMENTS

| | | | | |
|---|---|---|---|---|
| 4,464,741 | A | * | 8/1984 | Compaan ................ 369/112.19 |
| 5,742,577 | A | * | 4/1998 | Horimai et al. .......... 369/112.19 |
| 6,594,221 | B2 | * | 7/2003 | Ogasawara .............. 369/112.19 |
| 6,967,908 | B2 | * | 11/2005 | Ogasawara et al. ........ 369/44.23 |
| 2006/0164951 | A1 | * | 7/2006 | Yamasaki et al. ........ 369/112.01 |
| 2008/0165655 | A1 | * | 7/2008 | Saitoh et al. ............. 369/109.01 |

FOREIGN PATENT DOCUMENTS

| | | |
|---|---|---|
| JP | 2006252716 A | 9/2006 |
| JP | 2006260669 A | 9/2006 |

* cited by examiner

*Primary Examiner* — Jorge L Ortiz Criado
(74) *Attorney, Agent, or Firm* — Ditthavong Mori & Steiner, P.C.

(57) ABSTRACT

An optical pickup apparatus is provided with an angle adjusting element. The angle adjusting element changes a propagation direction of luminous fluxes of four luminous flux regions set about an optical axis of the laser light, out of laser light reflected by a disc, and mutually disperses the luminous fluxes. A signal light region in which signal light only is present appears on a detecting surface of a photodetector. A sensor pattern for signal light is placed at a position irradiated with the signal light within this region. A sensor pattern for a spherical aberration detection is placed on an inner side of this region.

18 Claims, 28 Drawing Sheets

(a) PARALLEL LIGHT PORTION (b) ON S1 PLANE SURFACE (c) ON S0 PLANE SURFACE (d) ON S2 PLANE SURFACE

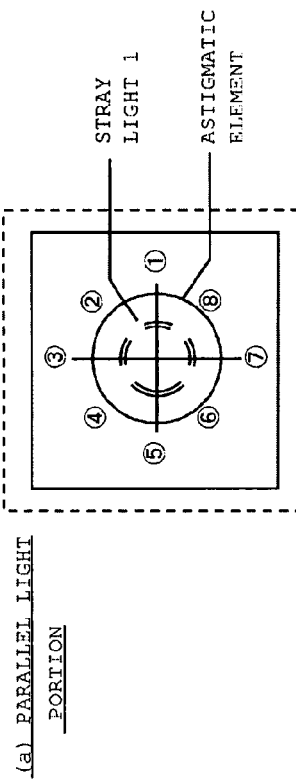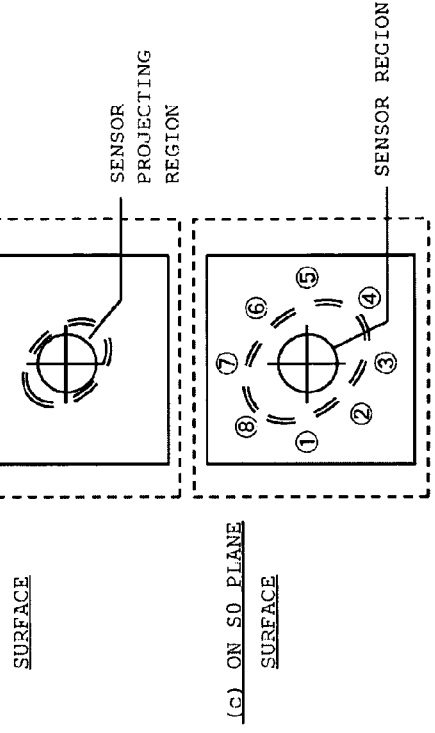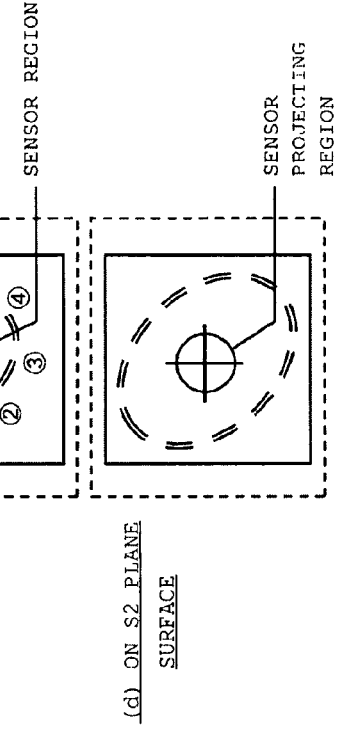
FIG. 2B
(a) PARALLEL LIGHT PORTION
(b) ON S1 PLANE SURFACE
(c) ON S0 PLANE SURFACE
(d) ON S2 PLANE SURFACE
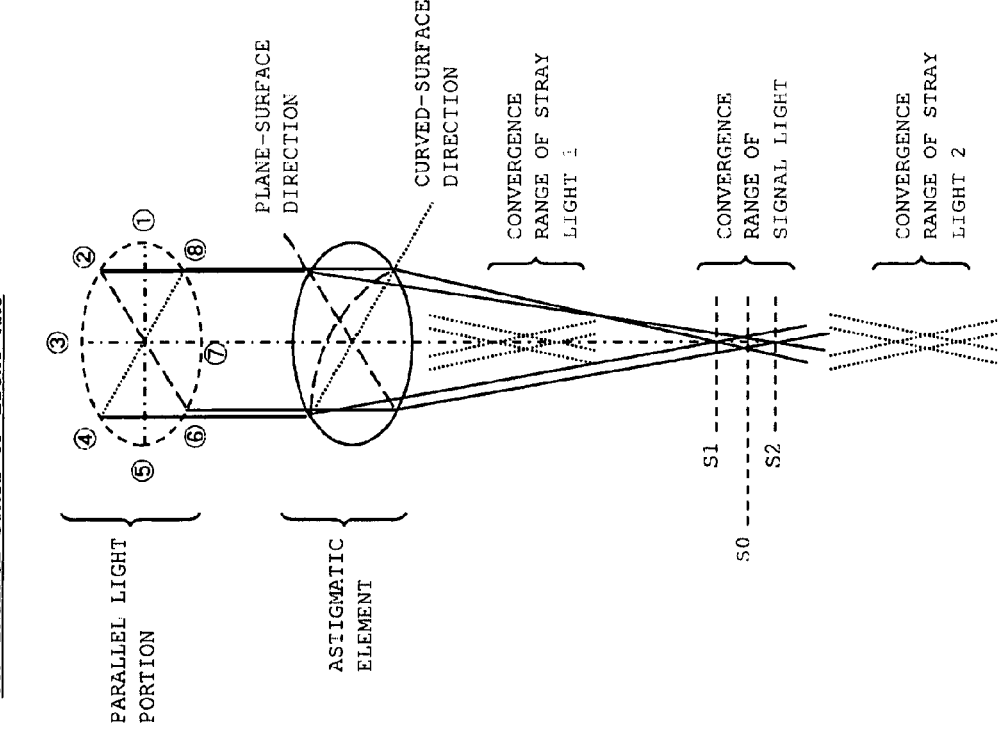
FIG. 2A

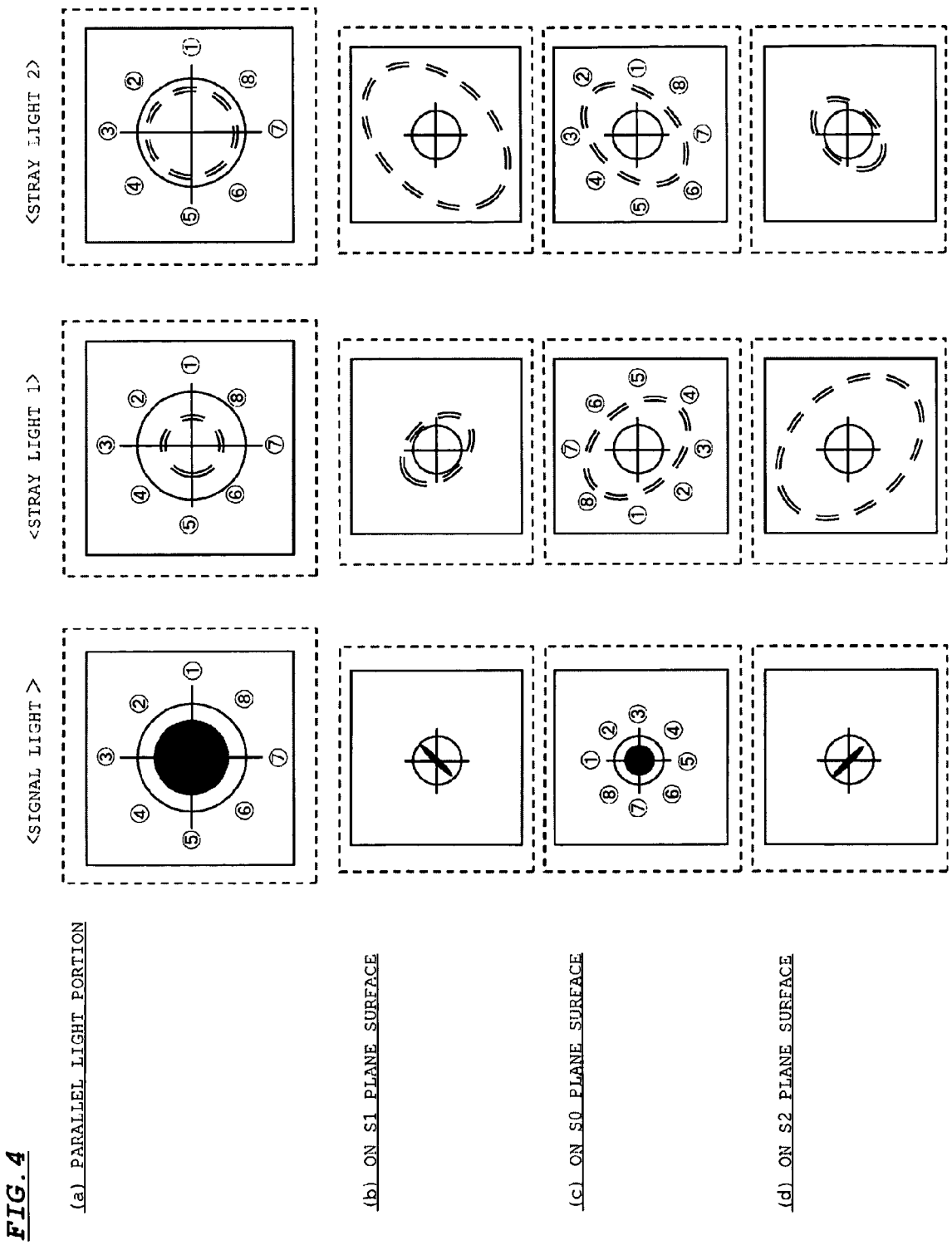

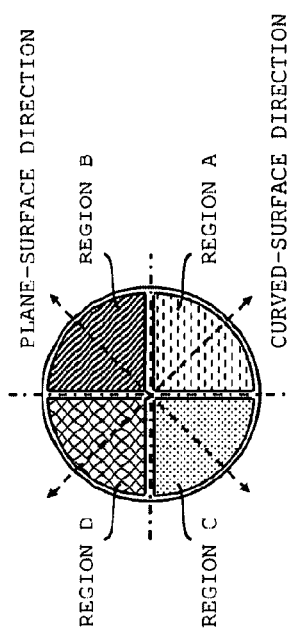
FIG. 5A LUMINOUS FLUX SPLITTING PATTERN
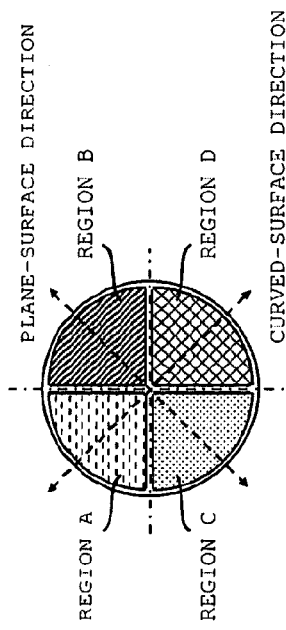
FIG. 5B SIGNAL LIGHT
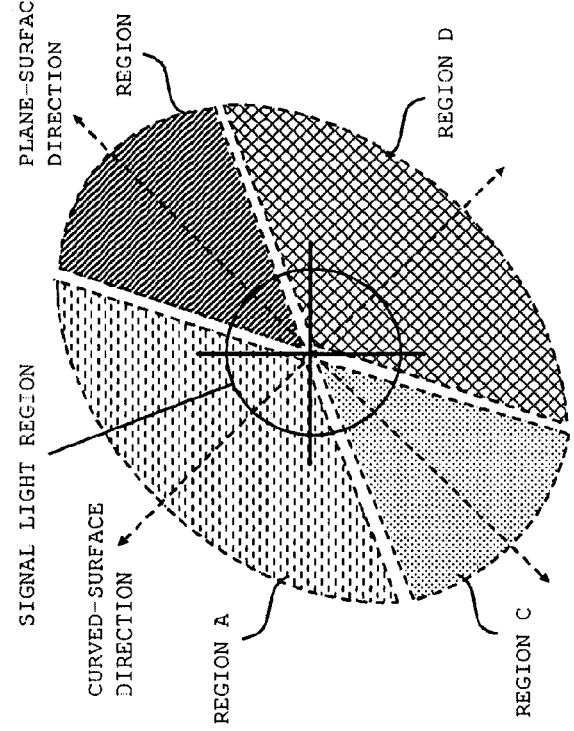
FIG. 5C STRAY LIGHT 1
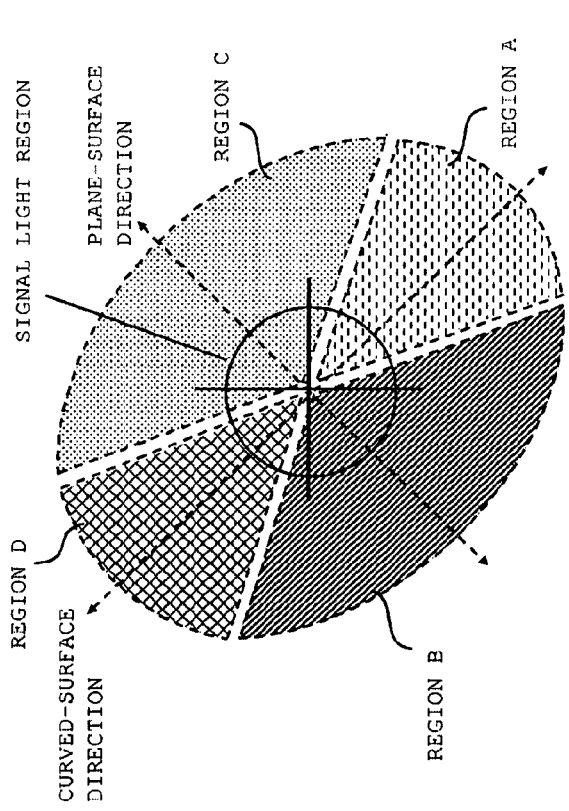
FIG. 5D STRAY LIGHT 2

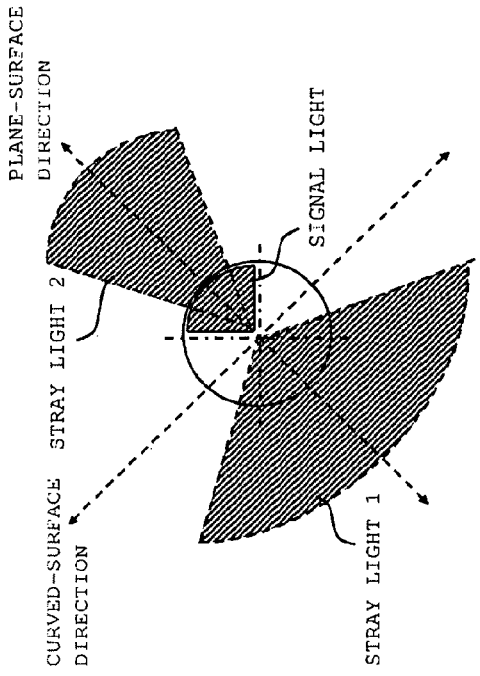
FIG. 6B  LUMINOUS FLUX STATE OF REGION B
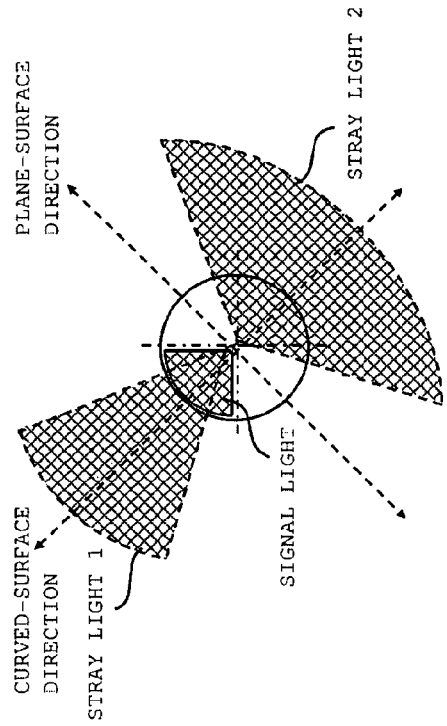
FIG. 6D  LUMINOUS FLUX STATE OF REGION D
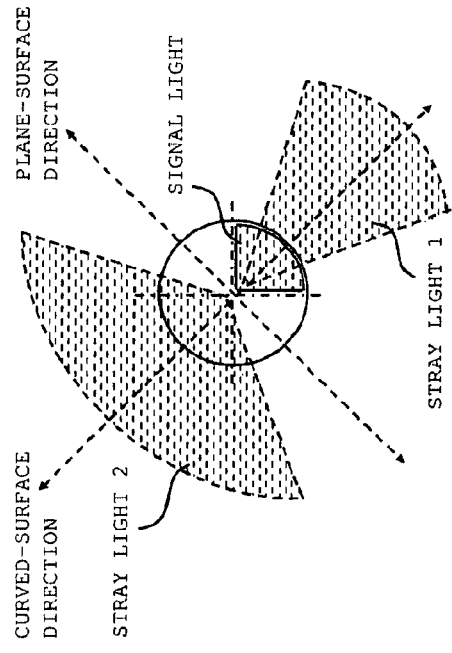
FIG. 6A  LUMINOUS FLUX STATE OF REGION A
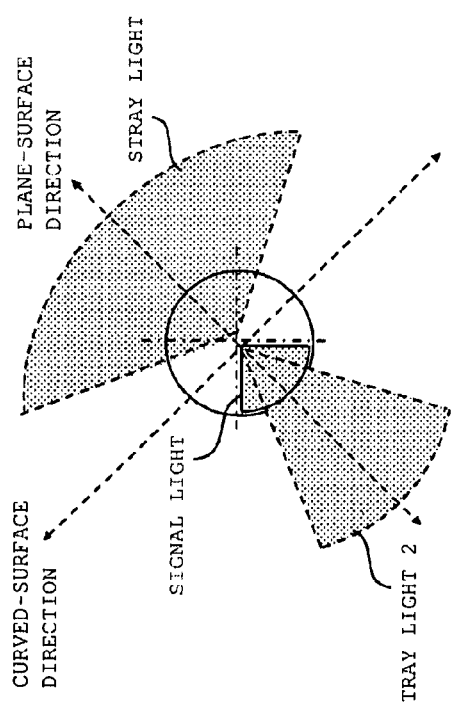
FIG. 6C  LUMINOUS FLUX STATE OF REGION C

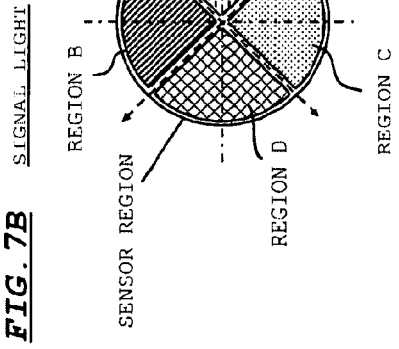
*FIG. 7A*  LUMINOUS FLUX SPLITTING PATTERN
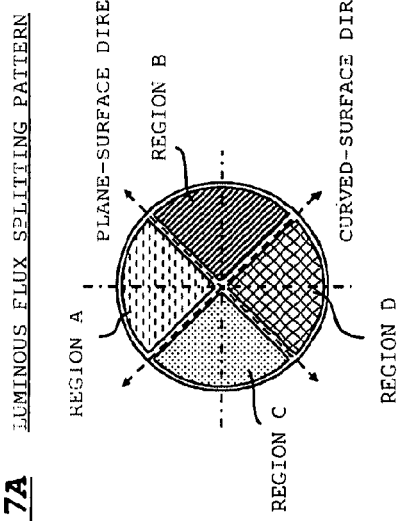
*FIG. 7B*  SIGNAL LIGHT
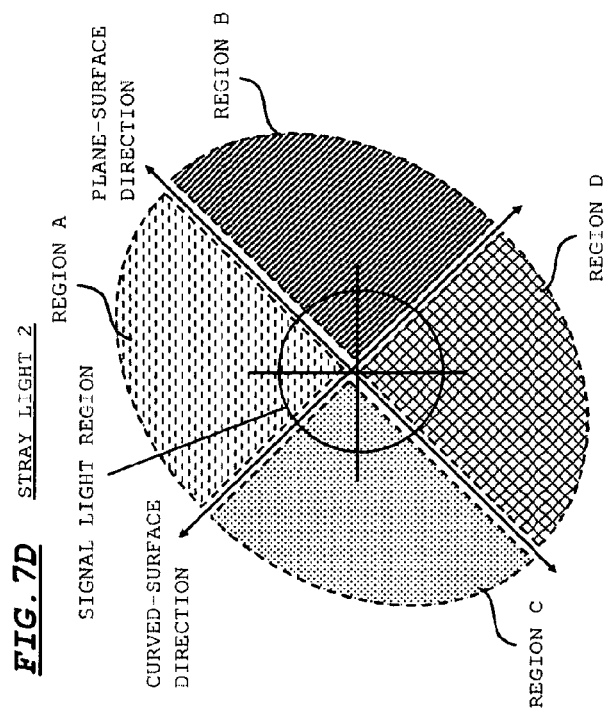
*FIG. 7C*  STRAY LIGHT 1
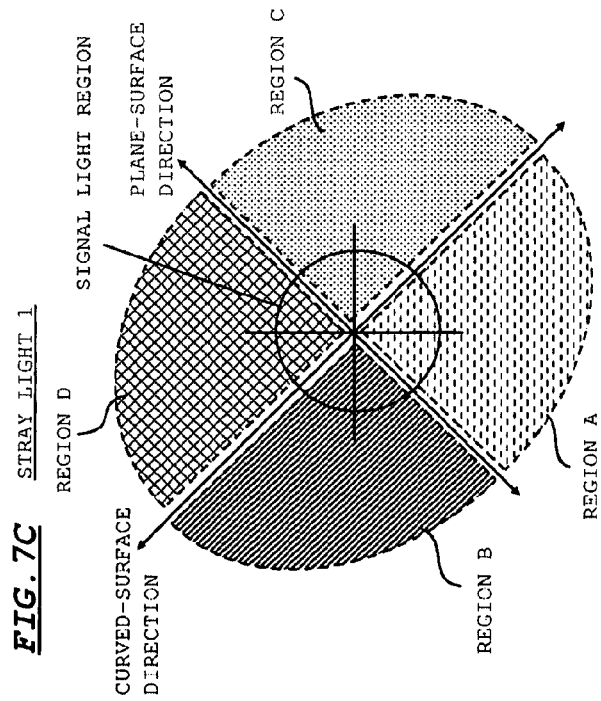
*FIG. 7D*  STRAY LIGHT 2

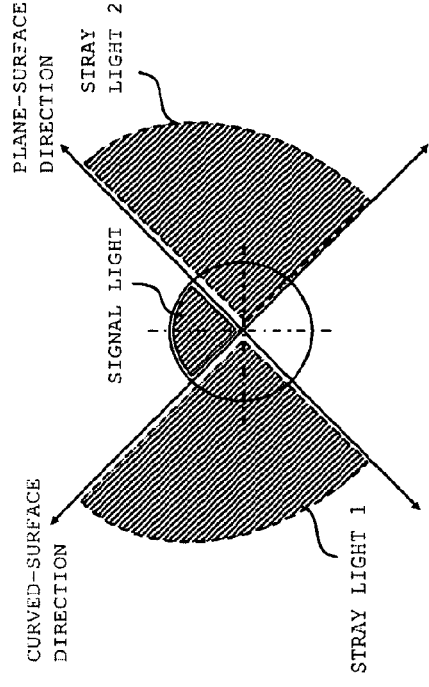
FIG. 8A  LUMINOUS FLUX STATE OF REGION A
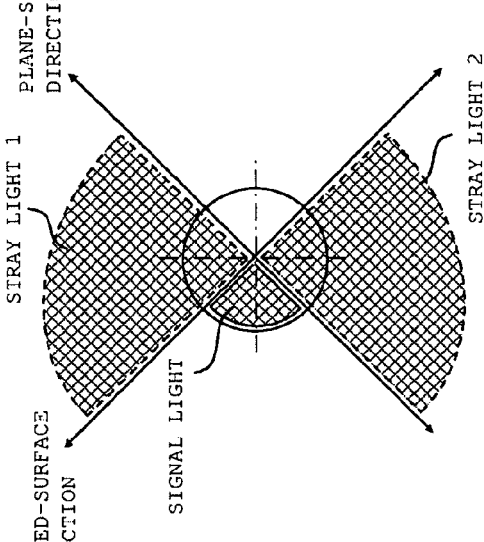
FIG. 8B  LUMINOUS FLUX STATE OF REGION B
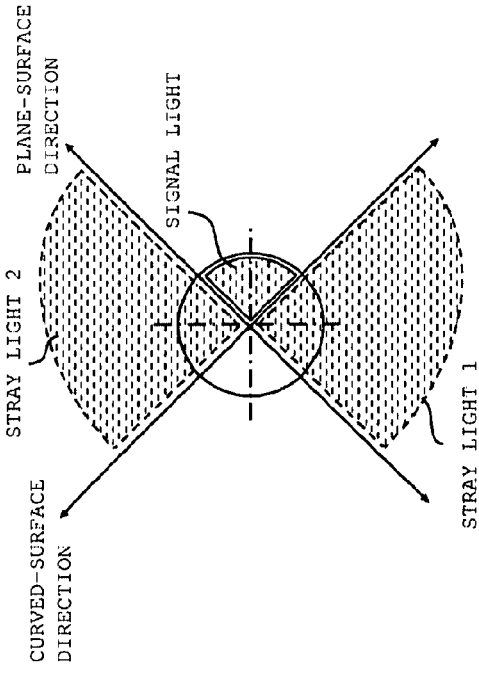
FIG. 8C  LUMINOUS FLUX STATE OF REGION C
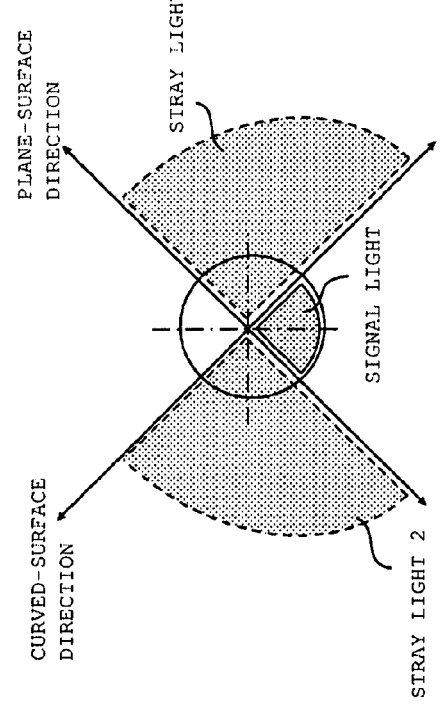
FIG. 8D  LUMINOUS FLUX STATE OF REGION D

LUMINOUS FLUX ON S0 PLANE SURFACE

ANGULAR PROVISION TO EACH REGION $FE = (A+B+E+F) - (C+D+G+H)$
$PP = (A+B+G+H) - (C+D+E+F)$ $FE = (A+B+E+F) - (C+D+G+H)$
$PP = (A+B+G+H) - (C+D+E+F)$

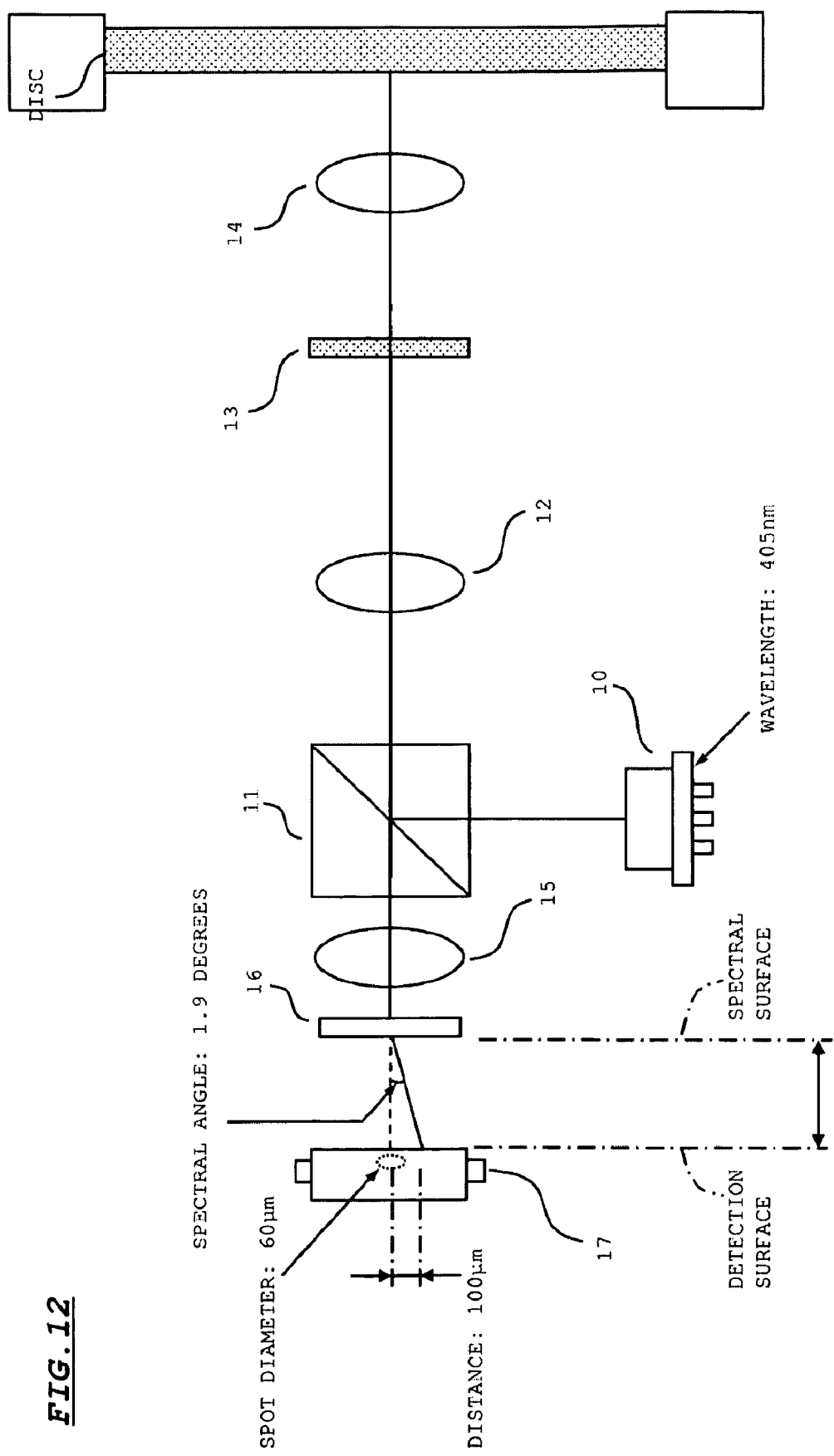

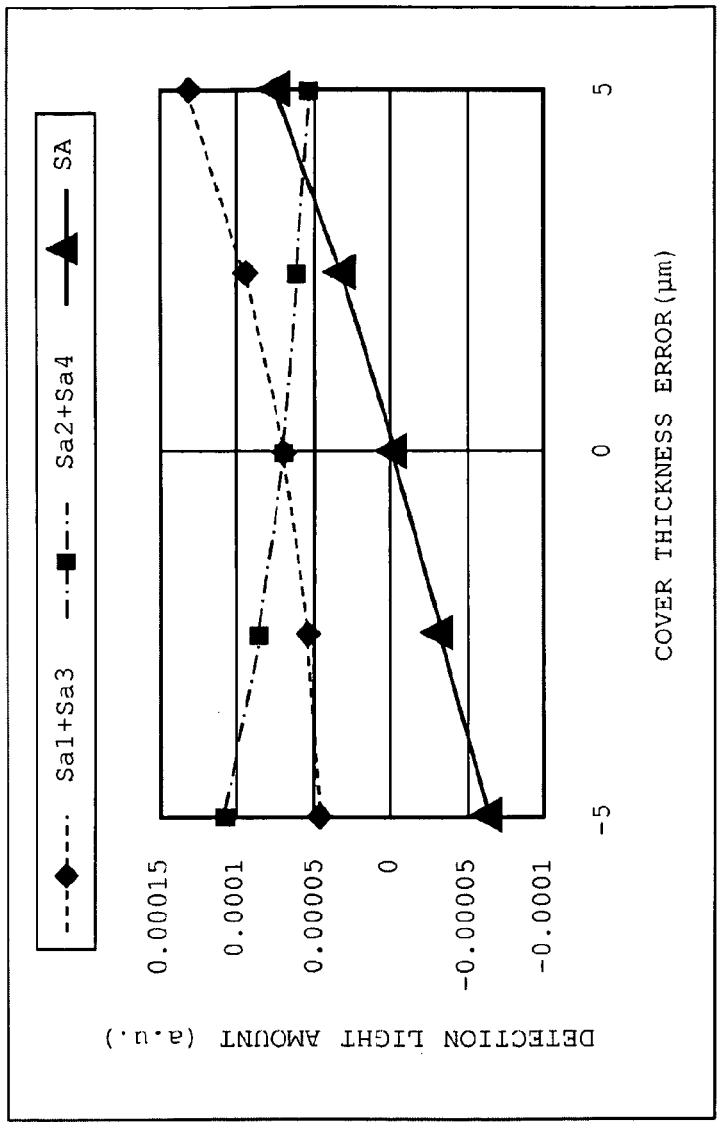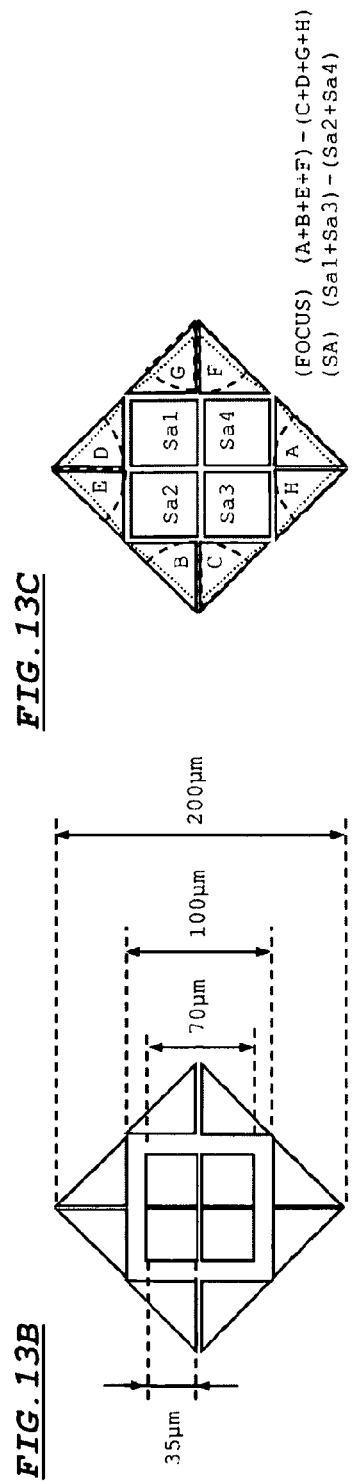
FIG. 13A
FIG. 13B
FIG. 13C (FOCUS) (A+B+E+F)−(C+D+G+H)
(SA) (Sa1+Sa3)−(Sa2+Sa4)

(FOCUS) (A+B+E+F)−(C+D+G+H)
(SA) (Sa1+Sa3)−(Sa2+Sa4)

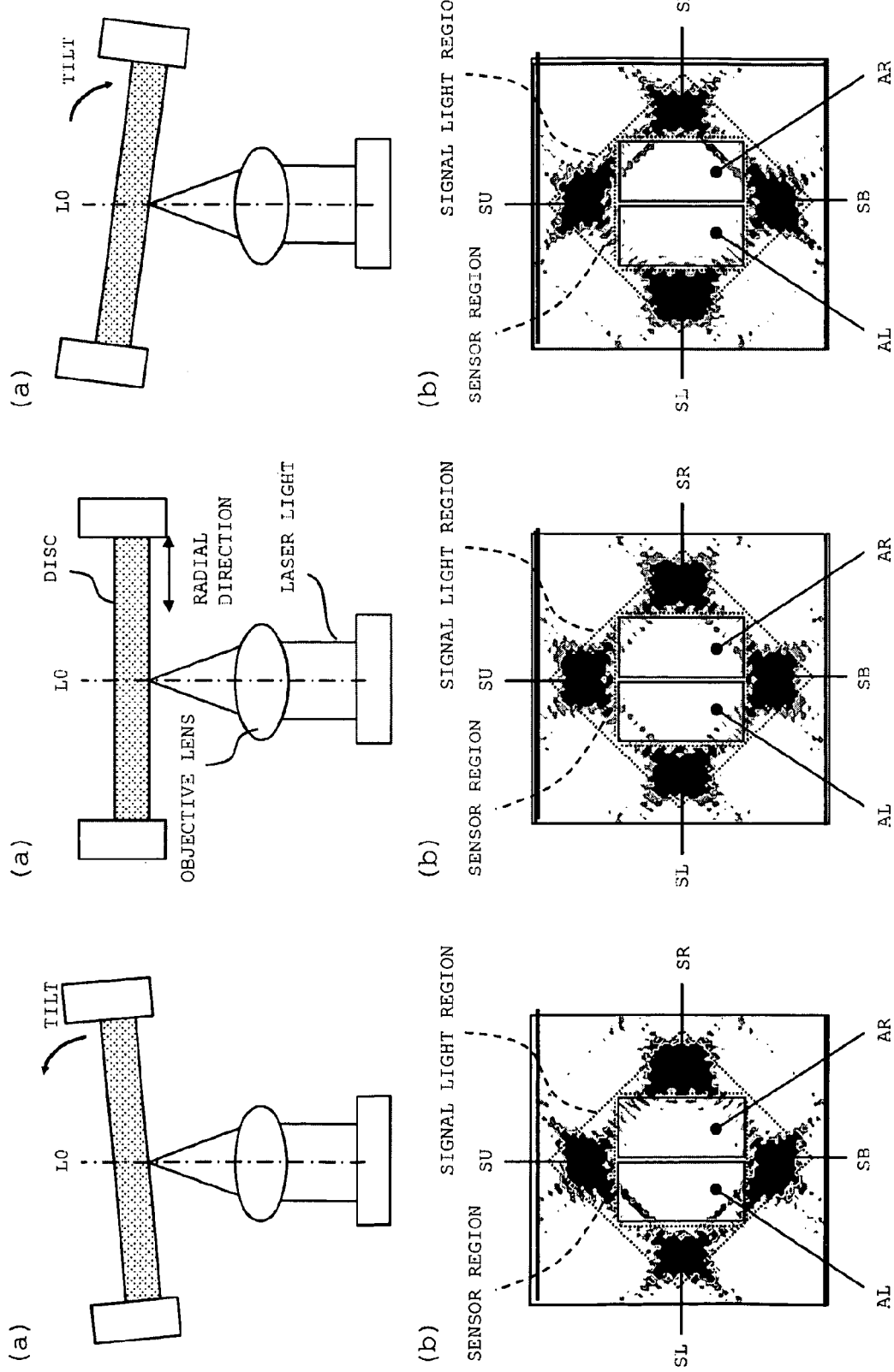

(FOCUS) (A+B+E+F) − (C+D+G+H)
(CM) (Sa2+Sa3) − (Sa1+Sa4)

OPTICAL PICKUP APPARATUS, FOCAL-POINT ADJUSTING METHOD, AND OPTICAL DISC APPARATUS

This application claims priority under 35 U.S.C. Section 119 of Japanese Patent Application No. 2008-200264 filed Aug. 1, 2008, entitled "OPTICAL PICKUP APPARATUS, FOCAL-POINT ADJUSTING METHOD, AND OPTICAL DISC APPARATUS".

BACKGROUND OF THE INVENTION

1. Field of the Invention

The present invention relates to an optical pickup apparatus, a focal-point adjusting method, and an optical disc apparatus, and more particularly, relates to an optical pickup apparatus, a focal-point adjusting method, and an optical disc apparatus suitable in use at the time of recording to and reproducing from a recording medium stacked thereon with a plurality of recording layers.

2. Description of the Related Art

In the recent years, along with the increased capacity of optical discs, the multilayered recording layers have been advanced. By including a plurality of recording layers in a single disc, the data capacity of the disc can be increased remarkably. When stacking the recording layers, the general practice until now has been to stack two layers on one side, but recently, to further advance the large capacity, disposing three or more recording layers on one side is also examined. Herein, when the number of recording layers to be stacked is increased, the large capacity of a disc can be promoted. However, on the other hand, the space between recording layers is narrowed, and signal degradation caused by crosstalk between layers increases.

If the recording layer is multilayered, a reflected light from the recording layer to be recorded or reproduced (target recording layer) becomes very weak. Therefore, when unnecessary reflected light (stray light) enters a photodetector from the recording layers present above and below the target recording layer, the detection signal is degraded, which may exert an adverse effect on a focus servo and a tracking servo. Therefore, when a large number of recording layers are disposed in this way, the stray light needs to be removed properly so as to stabilize the signals from the photodetector.

Herein, a method for removing the stray light includes that which uses a pinhole. In this method, a pinhole is disposed at a convergence position of the signal light. According to this method, a part of the stray light is intercepted by the pinhole, and therefore, the unnecessary stray light component entering the photodetector can be reduced. Another method for removing the stray light includes that which combines ½ wavelength plates and polarized light optical elements. According to this method, a polarization direction of the stray light is changed by the ½ wavelength plates, and the stray light is intercepted by the polarized light optical elements. Thus, the unnecessary stray light component entering the photodetector can be removed.

However, in the case of the method for removing the stray light by using a pinhole, the pinhole needs to be positioned accurately at the convergence position of a laser light (signal light) reflected from the target recording layer, and therefore, a task for adjusting the position of the pinhole is difficult, thus posing a problem. If the size of the pinhole is increased to facilitate the task for adjusting the position, the proportion of the stray light passing through the pinhole increases, and the signal degradation caused by the stray light cannot be inhibited effectively.

Furthermore, in the case of the method in which the ½ wavelength plates and the polarized light optical elements are combined to remove the stray light, apart from the fact that the ½ wavelength plates and the polarized light optical elements two each are needed to remove the stray light, a user needs to have two lenses, which increases the number of components and the cost, and adjusting the placement of each component is a complex process, thus posing a problem. Furthermore, the user needs to have a space for placing and arraying these components, which results in the enlargement of the optical system, thus posing a problem.

In addition, this type of optical pickup apparatus generates a spherical aberration in a laser light, due to a variation in the thickness of a cover layer of the optical disc or any other similar cause. Therefore, it is necessary to appropriately detect the generation of the resulting spherical aberration and correct the aberration.

SUMMARY OF THE INVENTION

An optical pickup apparatus according to a first aspect of the present invention comprises: a laser light source; an objective lens for converging laser light emitted from the laser light source onto a recording medium; and an astigmatic element for introducing an astigmatism into the laser light reflected by the recording medium. The astigmatic element mutually spaces a first focal line position occurring by the convergence of the laser light in a first direction and a second focal line position occurring by the convergence of the laser light in a second direction vertical to the first direction, into a propagation direction of the laser light. Moreover, the optical pickup apparatus is provided with: an angle adjusting element for mutually contradicting propagation directions of luminous fluxes, out of the laser light reflected by the recording medium, within four different luminous flux regions so that the luminous fluxes within the four luminous flux regions are mutually dispersed; a photodetector for outputting a detection signal when receiving each of the dispersed luminous fluxes; and a spherical-aberration correcting unit for correcting a spherical aberration occurring in the laser light. When an intersection point of two mutually crossing straight lines respectively parallel to the first direction and the second direction is matched to an optical axis of the laser light, the angle adjusting element sets the four luminous flux regions so that two of the luminous flux regions are placed in a direction in which a set of opposite angles made by the two straight lines are aligned and remaining two luminous flux regions are placed in a direction in which an alternate set of opposite angles are aligned. The photodetector includes first sensor section for receiving the four luminous fluxes individually and second sensor section for detecting a change of an intensity distribution of the luminous fluxes by the spherical aberration.

A second aspect of the present invention relates to a focal-point adjusting method for positioning a focal point position of an irradiation light on a target surface. The focal-point adjusting method comprises: introducing an astigmatism into the irradiation light reflected by the target surface so that a first focal line position occurring by convergence of the irradiation light in a first direction and a second focal line position occurring by convergence of the irradiation light in a second direction vertical to the first direction are mutually spaced in a propagation direction of the irradiation light; mutually contradicting propagation directions of luminous fluxes, out of the irradiation light reflected by the target surface, within four different luminous flux regions so that the luminous fluxes within the four luminous flux regions are mutually dispersed;

and receiving each of the dispersed luminous fluxes in a photodetector. When an intersection point of two mutually crossing straight lines respectively parallel to the first direction and the second direction is matched to an optical axis of the irradiation light, the four luminous flux regions are so set that two of the luminous flux regions are placed in a direction in which a set of opposite angles made by the two straight lines are aligned and remaining two luminous flux regions are placed in a direction in which an alternate set of opposite angles are aligned. The photodetector includes first sensor section for receiving the four luminous fluxes individually and second sensor section for detecting a change of an intensity distribution of the luminous fluxes by the spherical aberration. In this way, an arithmetic process based on an astigmatic method is performed on a detection signal outputted from the first sensor section so as to produce a focus error signal; and a signal expressing a spherical aberration is produced based on a detection signal outputted from the second sensor section.

An optical disc apparatus according to a third aspect of the present invention is provided with: an optical pickup apparatus according to the first aspect; an arithmetic circuit for performing an arithmetic process on a signal from the photodetector; and a servo circuit for driving and controlling the objective lens and the spherical-aberration correcting unit based on the signal from the arithmetic circuit.

BRIEF DESCRIPTION OF THE DRAWINGS

The above and other objects and novel features of the present invention will become more completely apparent from the description of the embodiment below taken with the following accompanying drawings.

FIGS. 2A and 2B are diagrams each describing the technical principle (a manner in which a light ray advances) according to the embodiment.

FIG. 4 is a diagram describing the technical principle (a manner in which a light ray advances) according to the embodiment.

FIGS. 5A to 5D are diagrams each describing the technical principle (a splitting pattern and a distribution of a luminous flux) according to the embodiment.

FIGS. 6A to 6D are diagrams each describing the technical principle (a splitting pattern and a distribution of a luminous flux) according to the embodiment.

FIGS. 7A to 7D are diagrams each describing the technical principle (a splitting pattern and a distribution of a luminous flux) according to the embodiment.

FIGS. 8A to 8D are diagrams each describing the technical principle (a splitting pattern and a distribution of a luminous flux) according to the embodiment.

FIG. 12 is a diagram showing an optical system used for verifying (simulating) the influence of the spherical aberration according to the embodiment.

FIG. 13A to FIG. 13C are diagrams each showing simulation results relating to influences of a spherical aberration according to the embodiment.

FIG. 21A to FIG. 21C are diagrams each describing the influence of a coma aberration according to the embodiment.

However, the diagrams are for the purposes of illustration only, and are not intended to limit the scope of the present invention.

DESCRIPTION OF THE PREFERRED EMBODIMENTS

An embodiment of the present invention will be described below with reference to the drawings.

Technical Principle

Firstly, with reference to FIG. 1A to FIG. 10D, a technical principle applied to this embodiment will be described.

Figure 1B:
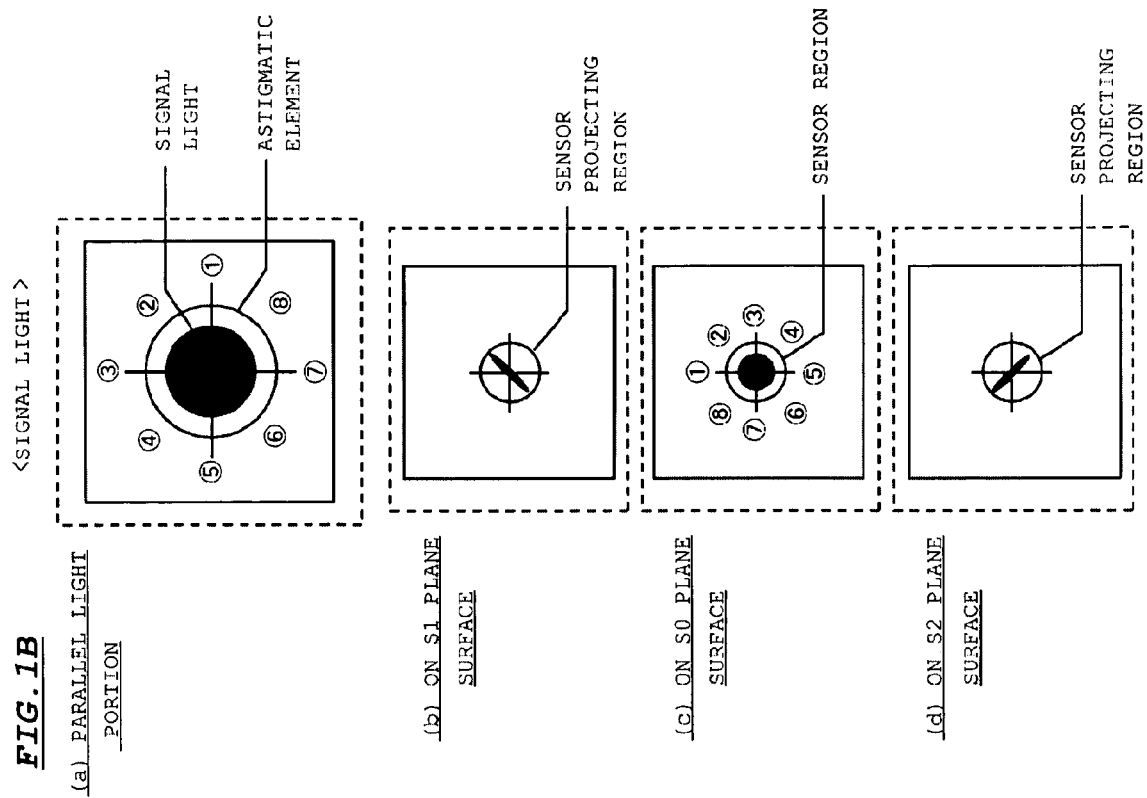
FIGS. 1A and 1B are diagrams each describing a technical principle (a manner in which a light ray advances) according to an embodiment.
Figure 1A:
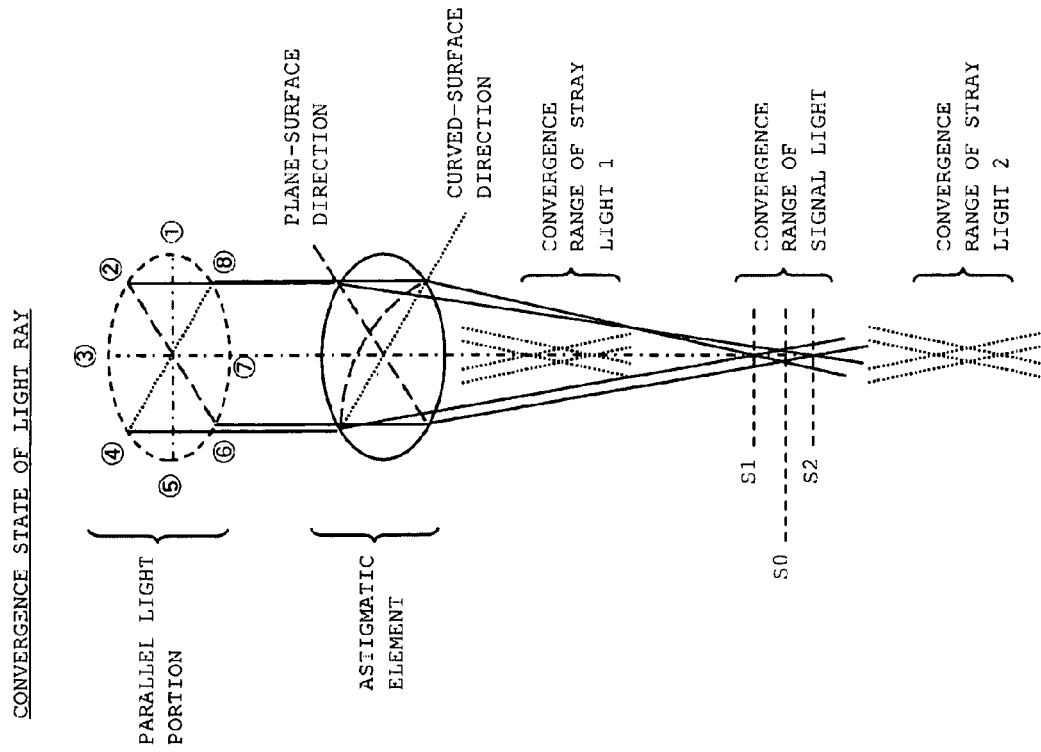

FIG. 1A is a diagram showing a convergence state of a signal light and a stray light, when the laser light (signal light) reflected by a target recording layer enters an astigmatic element, such as an anamorphic lens, in a state of a parallel light. A "stray light 1" is a laser light reflected by a recording layer present on a farther side by one layer than the target recording layer when seen from the side of a laser-light entering surface, and a "stray light 2" is a laser light reflected by a recording layer present on a nearer side by one layer than the target recording layer. FIG. 1A also shows a state when the signal light is focused on the target recording layer.

As illustrated, because of the effect of an anamorphic lens, a focal line occurs on a surface S1 due to the convergence of the signal light in a "curved-surface direction" shown in FIG. 1, and furthermore, a focal line occurs on a surface S2 due to the convergence of the signal light in a "plane-surface direction" shown in FIG. 1, which is vertical to the curved-surface direction. Thus, a spot of the signal light becomes minimum (circle of least confusion) on a surface S0 between the surfaces S1 and S2. In the case of a focus adjustment based on an astigmatic method, the surface S0 is situated as a light-receiving surface of a photodetector. It should be noted that in order to simplify the description of the astigmatic effect in the anamorphic lens, the "curved-surface direction" and the "plane-surface direction" are simply expressed for the sake of convenience, and in reality, it suffices that the effect for connecting the focal lines in positions different to each other occurs by the anamorphic lens. In this case, the anamorphic lens may also have a curvature in the "plane-surface direction" shown in FIG. 1A.

As shown in FIG. 1A, a focal line position of the stray light 1 (in FIG. 1A, a range between the two focal line positions by the astigmatic element is shown as a "convergence range") is closer to the astigmatic element as compared to the focal line position of the signal light, while a focal line position of the stray light 2 is further away from the astigmatic element as compared to the focal line position of the signal light.

FIGS. 1B(a) to 1B(d) are diagrams each showing a beam shape of the signal light in the parallel light portion and on the surfaces S1, S0, and S2, respectively. The signal light that has been entered on the astigmatic element in a true circle becomes elliptical on the surface S1, then after becoming a substantially true circle on the surface S0, it again becomes elliptical on the surface S2. Herein, the beam shapes formed on the surface S1 and on the surface S2, the respective long axes are vertical to each other.

As shown in FIGS. 1A and 1B(a), if eight positions (Positions 1 to 8: written by encircled numeric figures in FIGS. 1A and 1B) are set up in the anti-clockwise direction on the outer circumference of the beam in the parallel light portion, a light ray passing through the positions 1 to 8 each experiences convergence effect by the astigmatic element. The position 4 and the position 8 are positioned on a parting line when a beam cross section of the parallel light portion is split into two by a parallel straight line in the curved-surface direction, while the position 2 and the position 6 are positioned on a parting line when the beam cross section of the parallel light portion is split into two by a parallel straight line in the plane-surface direction. The Positions 1, 3, 5, and 7 are in the middle of the outer circular arc sectioned by the positions 2, 4, 6, and 8, respectively.

The light ray passing through the position 4 and the position 8 in the parallel light portion enters the surface S0 after being converged to the focal line in the curved-surface direction on the surface S1. Thus, the light ray passing through these positions 4 and 8 passes through the positions 4 and 8 shown in FIG. 1B(c), on the surface S0. Similarly, the light ray passing through the positions 1, 3, 5, and 7 in the parallel light portion also enters the surface S0 after being converged to the focal line in the curved-surface direction on the surface S1, and as a result, the light ray passes through the positions 1, 3, 5, and 7 shown in FIG. 1B(c), on the surface S0. In contrast to this, the light ray passing through the positions 2 and 6 in the parallel light portion enters the surface S0 without being converged to the focal line in the curved-surface direction, on the surface S1. Thus, the light ray passing through these positions 2 and 6 passes through the positions 2 and 6 shown in FIG. 1B(c), on the surface S0.

FIGS. 2B(a) to 2B(d) are diagrams each showing beam shapes and light ray passage positions of the stray light 1 in the parallel light portion and on the surfaces S1, S0, and S2, respectively. As shown in FIG. 2B(a), similar to the case of the aforementioned signal light, if eight positions 1 to 8 are set up on the outer circumference of the stray light 1, the light ray passing through these eight positions 1 to 8 enters on the surface S0 after being converged either to the focal line in the curved-surface direction or to the focal line in the plane-surface direction. Thus, the light ray passing through the positions 1 to 8 in the parallel light portion respectively passes through the positions 1 to 8 shown in FIG. 2B(c), on the surface S0.

Figure 3B:
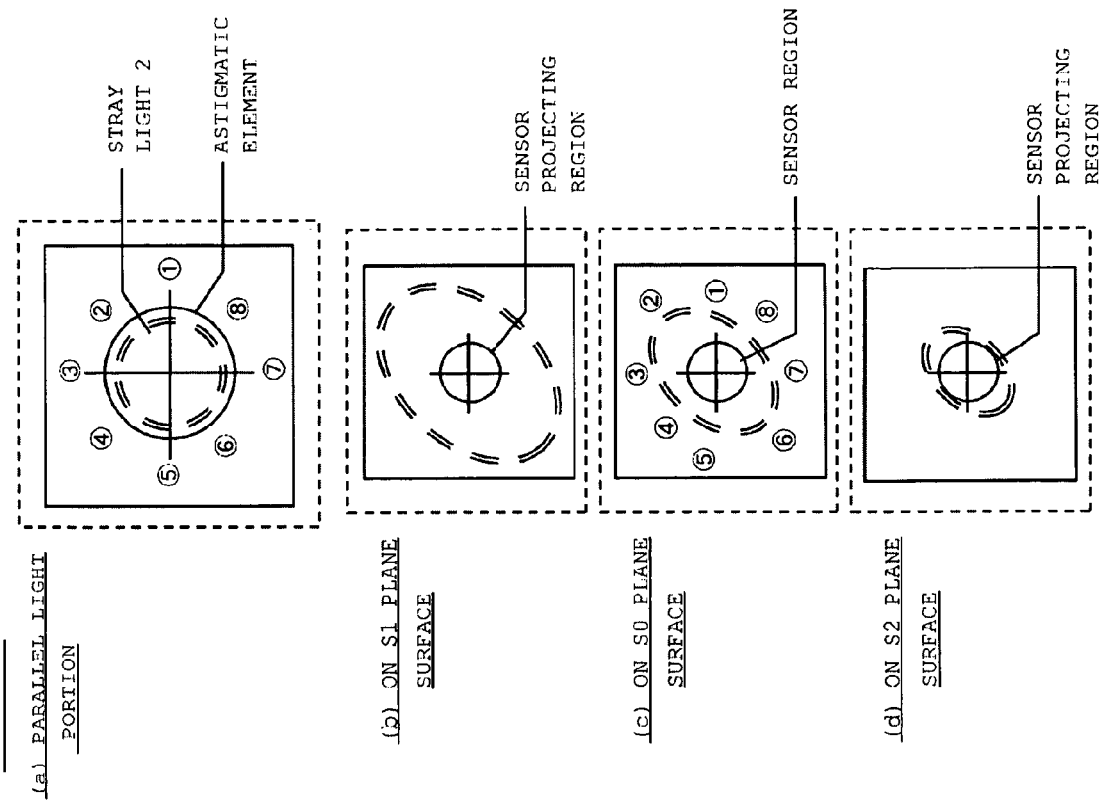
FIGS. 3A and 3B are diagrams each describing the technical principle (a manner in which a light ray advances) according to the embodiment.
Figure 3A:
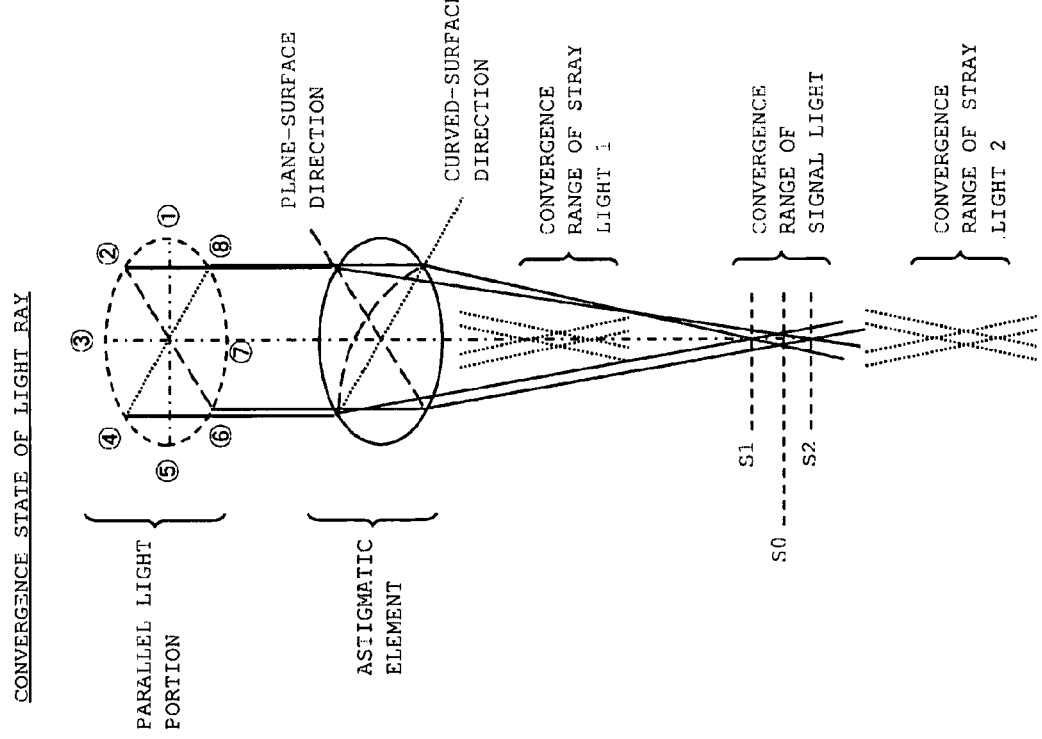

FIGS. 3B(a) to 3B(d) are diagrams each showing beam shapes and light ray passage positions of the stray light 2 in the parallel light portion and on the surfaces S1, S0, and S2, respectively. As shown in FIG. 3B(a), similar to the case of the aforementioned signal light, if eight positions 1 to 8 are set up on the outer circumference of the stray light 2, the light ray passing through these eight positions enters the surface S0 without being converged either to the focal line in the curved-surface direction or to the focal line in the plane-surface direction. Thus, the light ray passing through the positions 1 to 8 in the parallel light portion respectively passes through the positions 1 to 8 shown in FIG. 3B(c), on the surface S0.

FIG. 4 is a diagram in which the beam shapes and the light ray passage positions in the parallel light portion and on the surfaces S1, S0, and S2, described above, are shown by comparing among the signal light, the stray light 1, and the stray light 2. As can be understood by comparing rows shown in FIG. 4(c), luminous fluxes of the signal light, the stray light 1, and the stray light 2 passing through the position 1 in the parallel light portion pass through outer circumference positions different to one another, on the surface S0. Similarly, also the luminous fluxes of the signal light, the stray light 1, and the stray light 2 passing through the positions 3, 4, 5, 7, and 8 in the parallel light portion pass through outer circumference positions different to one another, on the surface S0. The luminous fluxes of the signal light and the stray light 2 passing through the positions 2 and 6 in the parallel light portion pass through the same outer circumference position on the surface S0. Also in this case, the luminous fluxes of the signal light and the stray light 1 passing through the positions 2 and 6 in the parallel light portion pass through outer circumference positions different to one another on the surface S0, and the luminous fluxes of the stray light 1 and the stray light 2 passing through the positions 2 and 6 in the parallel light portion pass through outer circumference positions different to one another on the surface S0.

Subsequently, in consideration of the phenomenon, a relationship between region splitting patterns of the signal light and the stray lights 1 and 2 in the parallel light portion, and irradiating regions of the signal light and the stray lights 1 and 2 on the surface S0 will be examined.

Firstly, as shown in FIG. 5A, the signal light and the stray lights 1 and 2 in the parallel light portion are split by two straight lines inclined at 45 degrees relative to the plane-surface direction and the curved-surface direction, to form four sections, i.e., luminous flux regions A to D. It should be noted that this splitting pattern corresponds to a region split based on the conventional astigmatic method.

In this case, based on the aforementioned phenomenon, the signal light of the luminous flux regions A to D is distributed on the surface S0 as shown in FIG. 5B. Furthermore, based on the aforementioned phenomenon, the stray light 1 and stray light 2 in the luminous flux regions A to D are distributed as shown in FIGS. 5C and 5D, respectively.

Herein, if the signal light and the stray lights 1 and 2 on the surface S0 are extracted for each luminous flux region, the distribution of each light will be as shown in FIGS. 6A to 6D. In such a case, either one of the stray light 1 or the stray light 2 in the same luminous flux region overlaps the signal light in each luminous flux region all the time. Therefore, if the signal light in each luminous flux region is received by a sensor pattern on a photodetector, at least the stray light 1 or the stray light 2 in the same luminous flux region will simultaneously enter the corresponding sensor pattern, thus causing a degradation of the detection signal.

In contrast to this, as shown in FIG. 7A, the signal light and the stray lights 1 and 2 in the parallel light portion are split by two straight lines parallel to the plane-surface direction and the curved-surface direction, to form four sections, i.e., luminous flux regions A to D. In such a case, based on the aforementioned phenomenon, the signal light of the luminous flux regions A to D is distributed on the surface S0 as shown in FIG. 7B. Furthermore, based on the aforementioned phenomenon, the stray light 1 and the stray light 2 of the luminous flux regions A to D are distributed as shown in FIGS. 7C and 7D, respectively.

Herein, if the signal light and the stray lights 1 and 2 on the surface S0 are extracted for each luminous flux region, the distribution of each light will be as shown in FIGS. 8A to 8D. In such a case, neither the stray light 1 nor the stray light 2 in the same luminous flux region overlaps the signal light in each luminous flux region. Therefore, after scattering the luminous fluxes (the signal light, and the stray lights 1 and 2) within each luminous flux region in different directions, if the configuration is such that only the signal light is received by the sensor pattern, only the signal light will enter the corresponding sensor pattern, and the entry of the stray light can be inhibited. Thus, the degradation of the detection signal due to the stray light can be avoided.

As described above, the signal light and the stray lights 1 and 2 are split into the four luminous flux regions A to D by two straight lines parallel to the plane-surface direction and the curved-surface direction, and by dispersing the light passing through these luminous flux regions A to D, and then alienating it on the surface S0, it becomes possible to extract only the signal light. The embodiment is based on this principle.

Figure 9B:
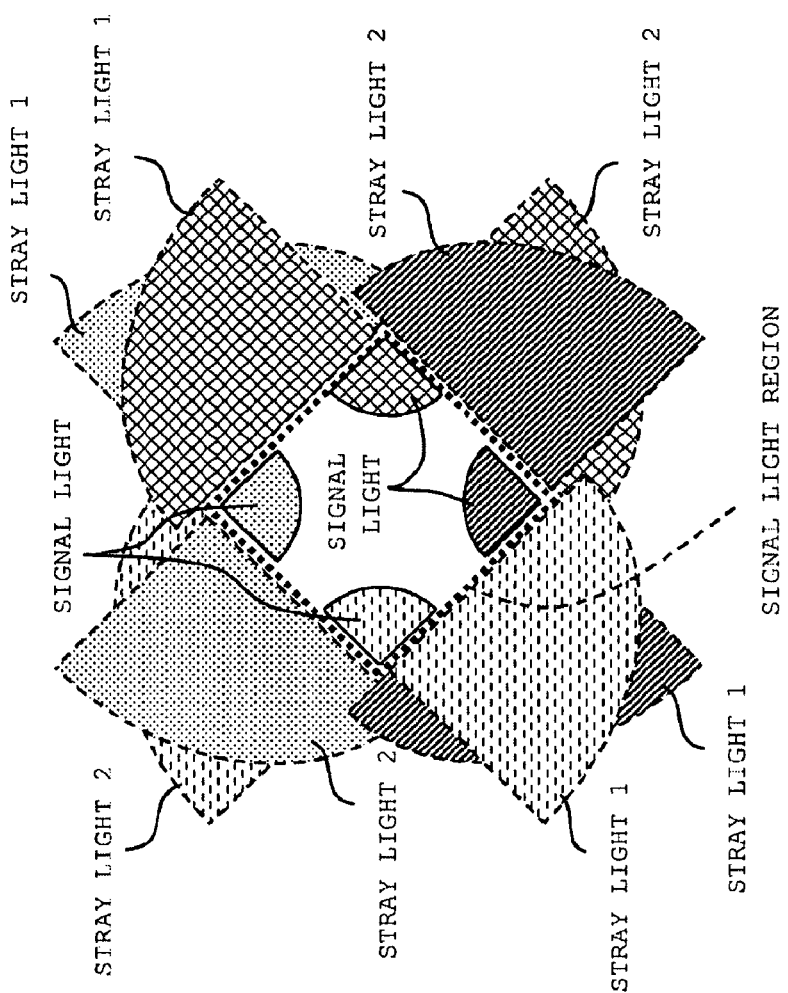
FIGS. 9A and 9B are diagrams each describing the technical principle (an angular provision and a distribution of a luminous flux) according to the embodiment.
Figure 9A:
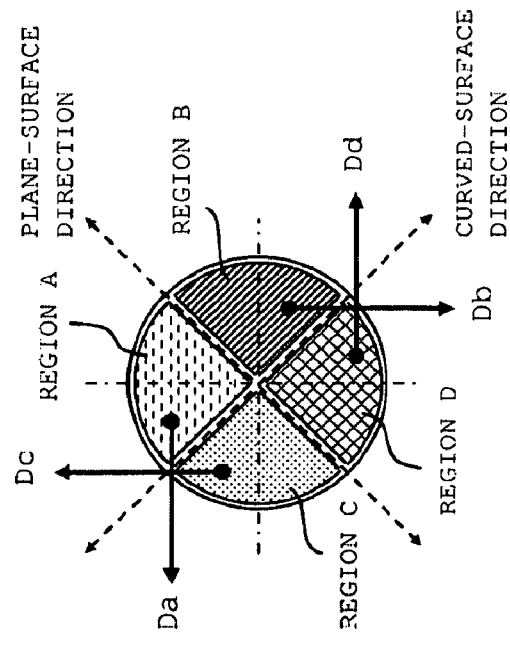

FIGS. 9A and 9B are diagrams each showing distribution states of the signal light and the stray lights 1 and 2 on the surface S0, when advancing directions of the luminous fluxes (the signal light, and the stray lights 1 and 2) passing through the four luminous flux regions A to D shown in FIG. 7A are changed by the same angle in the respectively different directions. Herein, as shown in FIG. 9A, the advancing directions of the luminous fluxes (the signal light, and the stray lights 1 and 2) passing through the luminous flux regions A to D are changed by the same angular amount $\alpha$ (not shown) in the directions Da, Db, Dc, and Dd, respectively. Each of the directions Da, Db, Dc, and Dd are inclined at 45 degrees relative to the plane-surface direction and the curved-surface direction.

In such a case, by regulating the angular amount $\alpha$ in the directions Da, Db, Dc, and Dd, the signal light and the stray lights 1 and 2 in each luminous flux region can be distributed on the plane surface S0, as shown in FIG. 9B. As a result, as shown in FIG. 9B, a signal light region containing only the signal light can be set up on the plane surface S0. By setting a sensor pattern of the photodetector in this signal light region, only the signal light of each region can be received by the corresponding sensor pattern.

Figure 10C:
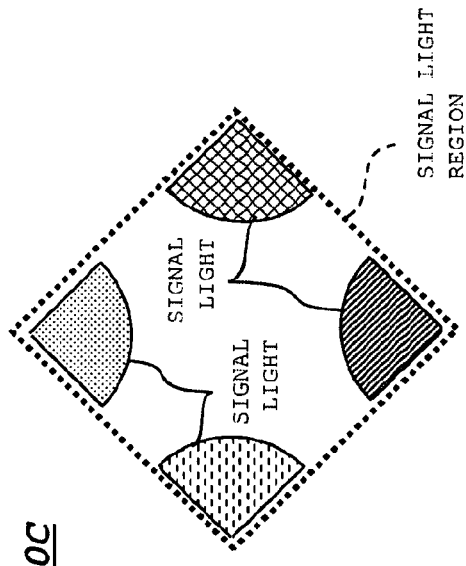
FIGS. 10A to 10D are diagrams each describing a method for placing a sensor pattern according to the embodiment.
Figure 10D:
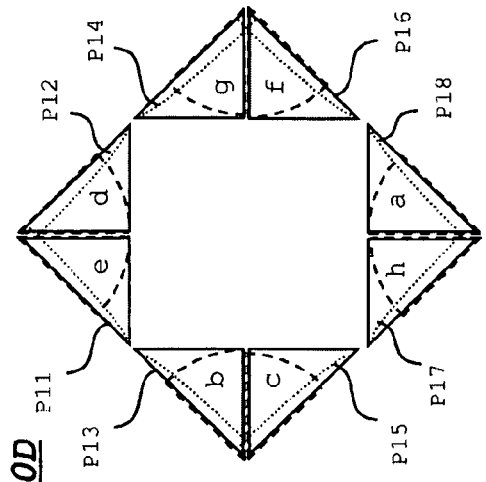
Figure 10A:
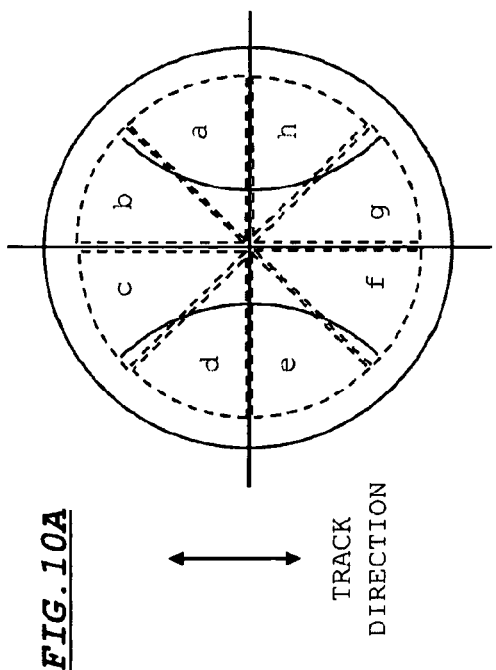
Figure 10B:
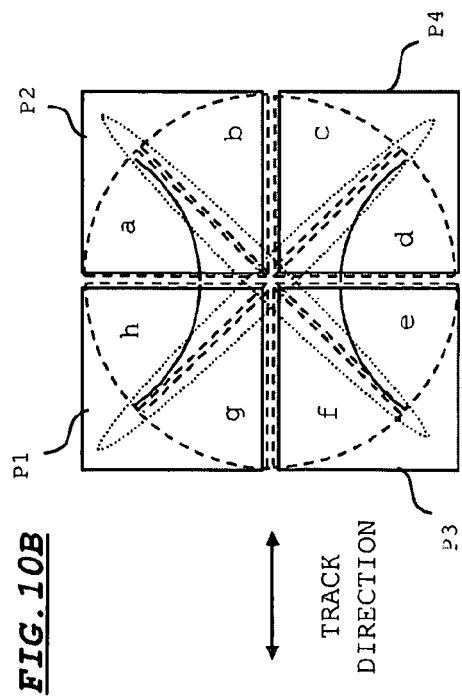

FIGS. 10A to 10D are diagrams each describing a method for placing the sensor pattern to generate a focus error signal and a push-pull signal. FIGS. 10A and 10B are diagrams each showing a splitting method of the luminous flux and the sensor pattern based on the conventional astigmatic method, while FIGS. 10C and 10D are diagrams each showing a splitting method of the luminous flux and the sensor pattern based on the aforementioned principle. Herein, a track direction has an inclination of 45 degrees relative to a planar direction and a curvature direction. In FIGS. 10A and 10B, for illustration purposes, the luminous flux is sectioned into eight luminous flux regions a to h. Furthermore, the diffracted image due to the track groove is shown by the solid line and the shape of the beam when off focus is shown by the dotted line.

In the conventional astigmatic method, sensor patterns P1 to P4 (quadratic sensor) of a photodetector are set as shown in FIG. 10B. In such a case, if detection signal components based on the light intensity of the luminous flux regions a to h are represented by A to H, a focus error signal FE is evaluated by an arithmetic operation of: $FE=(A+B+E+F)-(C+D+G+H)$, and a push-pull signal PP is evaluated by an arithmetic operation of $PP=(A+B+G+H)-(C+D+E+F)$.

In contrast to this, in the case of the distribution state in FIG. 9B, as described above, the signal light is distributed within the signal light region according to the state shown in FIG. 10C. In such a case, if the distribution of the signal light passing through the luminous flux regions a to h shown in FIG. 10A is overlapped on the distribution shown in FIG. 10C, a distribution as shown in FIG. 10D results. That is, the signal light passing through the luminous flux regions a to h in FIG. 10A is guided into the luminous flux regions a to h shown in FIG. 10D, on the surface S0 on which the sensor pattern of the photodetector is installed.

Therefore, if the sensor patterns P11 to P18 that are shown to be overlapped in FIG. 10D are set to the positions of the luminous flux regions a to h shown in FIG. 10D, the focus error signal and push-pull signal can be generated by the same arithmetic process as that in FIG. 10B. That is, also in this case, if the detection signals from the sensor patterns receiving the luminous flux of the luminous flux regions a to h are represented by A to H, similar to the case in FIG. 10B, the focus error signal FE can be acquired by an arithmetic operation of $FE=(A+B+E+F)-(C+D+G+H)$, and the push-pull signal PP can be acquired by an arithmetic operation of $PP=(A+B+G+H)-(C+D+E+F)$.

As described above, according to this principle, if the signal light and the stray lights 1 and 2 in the parallel light portion are split into the four luminous flux regions A to D by two straight lines parallel to the plane-surface direction and the curved-surface direction shown in FIG. 1A, and the light passing through these luminous flux regions A to D is dispersed, and the dispersed signal light in each luminous flux region A to D is received individually by a light-receiving portion split into two, the focus error signal and push-pull signal can be generated by the same arithmetic process as in the case based on the conventional astigmatic method.

Next, the influence of a spherical aberration when applying this principle will be described.

Figure 11A:
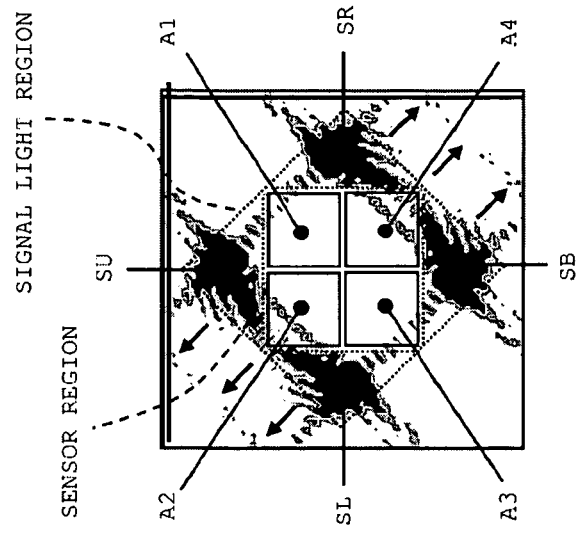
FIG. 11A to FIG. 11C are diagrams each describing the influence of a spherical aberration according to the embodiment.
Figure 11B:
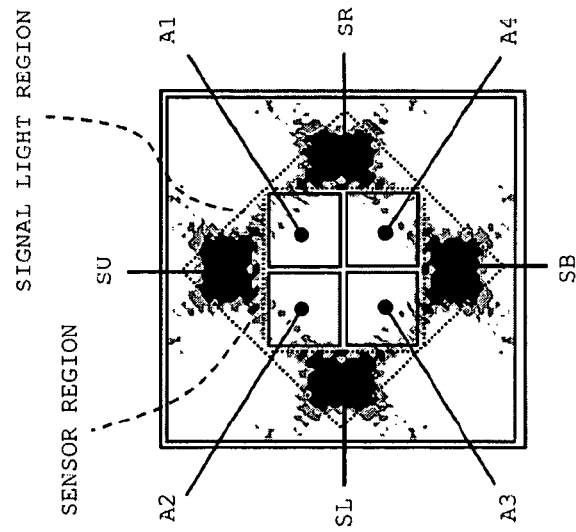
Figure 11C:
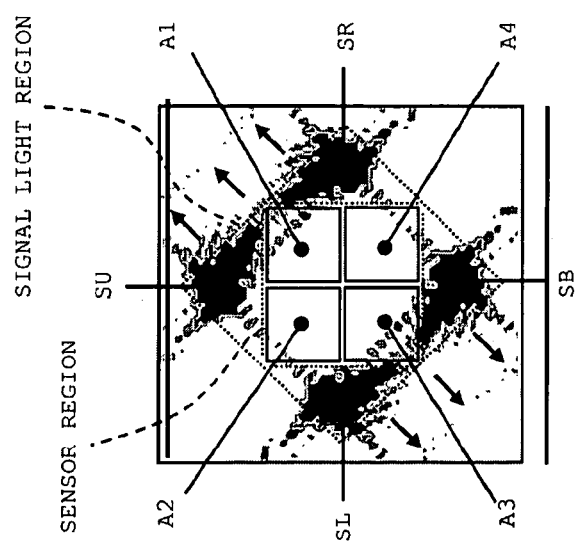

FIG. 11A to FIG. 11C show simulation results obtained by using a simulation of the influence of a spherical aberration occurring in a signal light on a light detecting surface. Each simulation result shows an intensity distribution for a signal light on a light detecting surface when a distance from a disc incident surface to a target recording layer differs. The laser light in all simulation results is in an on-focus state relative to the target recording layer.

FIG. 11B shows a state of a signal light when the distance from a disc incident surface (assuming a Blu-ray disc) to a target recording layer is appropriate. FIG. 11A and FIG. 11C respectively show states of a signal light when the distance from the disc incident surface to the target recording layer is diverged from an appropriate value.

In FIG. 11A to FIG. 11C, the closer to black, the greater the light intensity. FIG. 11A shows a simulation result when the distance from the disc incident surface to the target recording layer is increased by 5 µm from the appropriate state shown in FIG. 11B and a magnitude of a three-dimensional spherical aberration is 50 mλrms. FIG. 11C shows a simulation result when the distance from the disc incident surface to the target recording layer is decreased by 5 µm from the appropriate state shown in FIG. 11B and the magnitude of the three-dimensional spherical aberration is 50 mλrms.

FIG. 12 is a diagram showing an optical system used for the simulation in FIG. 11C. In FIG. 12, reference numeral 10 denotes a semiconductor laser for emitting a laser light at a wavelength of 405 nm; 11 is a polarizing beam splitter for reflecting substantially all of the laser light emitted from the semiconductor laser 10; 12 is a collimate lens for converting a laser light into a parallel light; 13 is a ¼ wavelength plate for converting a laser light (linearly polarized light) incident from the collimate lens 12 side into a circularly polarized light; 14 is an objective lens for converging a laser light onto a disc; 15 is a detection lens for introducing an astigmatism into a reflected light from the disc transmitting the polarizing beam splitter 11; 16 is an angle adjusting element for imparting an operation described with reference to the preceding FIG. 9A to a laser light; and 17 is a photodetector.

As described with reference to the preceding FIG. 9A, the angle adjusting element has an operation which mutually isolates the laser light passing through four luminous flux regions A to D so as to distribute on the light detecting surface the laser light passing through the respective luminous flux regions as shown in FIG. 9B. It should be noted that in this simulation, single recording layers are assumed to be present one each before and after the target recording layer. Intervals between the target recording layer and the recording layers present before and after the target recording layer are 10 µm, respectively.

Design conditions for the optical system are shown as follows:
(1) Approach-route factor: 10 magnifications;
(2) Return-route factor: 18 magnifications;
(3) Spectral angle imparted by angle adjusting element 16: 1.9 degrees;
(4) Optical path length between detection surface of photodetector 17 and spectral surface of angle adjusting element 16: 3 mm;
(5) Spot diameter on light detecting surface when angle adjusting element 16 is not disposed: 60 µm; and
(6) Displacement distance for each signal light (respectively passing through luminous flux regions A to D) on the light detecting surface when angle adjusting element 16 is disposed: 100 µm.

The approach-route factor is a ratio of the focal point distance of the collimate lens to the focal point distance of the objective lens. The return-route factor is a ratio of a synthetic focal point distance of the detection lens and the collimate lens, to the focal point distance of the objective lens. In this optical system, the laser light (signal light) which is reflected by the disc forms a least circle of confusion on the detection surface when the angle adjusting element 16 is removed. The spot diameter in (5) above is the diameter of the least circle of confusion. Furthermore, the displacement distance in (6) above is a distance between an optical axial center of the signal light on the detection surface when the angle adjusting element 16 is removed and an apical position (position of the apex when a fan shape shown in FIG. 8A to FIG. 8D is a right angle) of the respective signal light when the angle adjusting element 16 is disposed.

In FIG. 11A to FIG. 11C, a signal light in a range of equal to or more than 1/200 and equal to or less than 1/100 of a peak intensity is plotted in gray and a signal light in a range of equal to or more than that intensity is plotted in black.

With reference to FIG. 11B, when a spherical aberration is not generated, the intensities of the four signal lights SL, SR, SU, and SB on the light detecting surface are equal to one another. Moreover, an intensity distribution of the signal light on the light detecting surface is well balanced relative to transverse (right and left) and vertical (up and down) directions in FIG. 11B. In this case, as shown in FIG. 11B, when light receiving regions A1 to A4 are set to symmetrical vertical and transverse positions within the signal light regions, amounts of signal light received in the light receiving regions A1 to A4 are equal to one another. Therefore, when sensors are respectively placed in the light receiving regions A1 to A4 and output signals from the respective sensors are denoted as SA1 to SA4, the following relationship of (SA1+SA3)−(SA2+SA4)=0 is established.

Subsequently, with reference to FIG. 11A, when a spherical aberration is generated by increasing the distance from the disc incident surface to the target recording layer by 5 µm from the appropriate value shown in FIG. 11B, the intensity distribution of signal light deviates from the state shown in FIG. 11B in a direction of an arrow shown in FIG. 11A. As a result, amounts of signal lights received in the light receiving regions A1 and A3 are increased more than those received in the light receiving regions A2 and A4. Therefore, when sensors are respectively placed in the light receiving regions A1 to A4 and output signals from the respective sensors are denoted as SA1 to SA4, the following relationship of (SA1+SA3)−(SA2+SA4)>0 is established.

With reference to FIG. 11C, when a spherical aberration is generated by decreasing the distance from the disc incident surface to the target recording layer by 5 µm from the appropriate value shown in FIG. 11B, the intensity distribution of signal light deviates from the state shown in FIG. 11B in a direction of an arrow shown in FIG. 11C. As a result, amounts of signal lights received in the light receiving regions A2 and A4 are increased more than those received in the light receiving regions A1 and A3. Therefore, when sensors are respectively placed in the light receiving regions A1 to A4 and output signals from the respective sensors are denoted as SA1 to SA4, the relationship of (SA1+SA3)−(SA2+SA4)<0 is established.

In this manner, when the light receiving regions A1 to A4 are set to symmetrical vertical and transverse positions within the signal light regions and the sensors are placed in the light receiving regions A1 to A4, the direction and magnitude of the spherical aberration can be detected by performing an arithmetic operation of (SA1+SA3)−(SA2+SA4) with respect to the output signals SA1 to SA4 from the sensors.

FIG. 13A shows simulation results obtained, under the above-described simulation conditions, by simulating a change of amounts of received signal light when the distance from the disc incident surface to the target recording layer is changed from an appropriate value. A vertical axis in FIG.

13A shows the amount of signal light received on a signal detecting surface of the photodetector 17.

In this simulation, a sensor pattern having the dimensions shown in FIG. 13B is placed on the signal detecting surface of the photodetector 17. FIG. 13A shows the arithmetic results obtained when an arithmetic operation of Sa1+Sa3 and Sa2+Sa4 is performed on the amounts of signal light (for the sake of convenience, the amounts of light received in Sa1 to Sa4 are expressed as Sa1 to Sa4) received by four central sensors Sa1 to Sa4 (see FIG. 13C), and also, the arithmetic results obtained from SA=(Sa1+Sa3)−(Sa2+Sa4) as parameter values showing a magnitude of the spherical aberration (SA). The sensors Sa1 to Sa4 are respectively placed in the light receiving regions A1 to A4 in FIG. 11A to FIG. 11C.

As seen from the simulation results, as described above, when the light receiving regions A1 to A4 are set to the symmetrical transverse position within the signal light regions and the sensors Sa1 to Sa4 are placed respectively in the light receiving regions A1 to A4, the direction and magnitude of the spherical aberration can be detected by using a difference between an additional value of the output signals from the sensors Sa1 and Sa3 and an additional value of the output signals from the sensors Sa2 and Sa4.

Embodiment

An embodiment based on the principle will be described below.

Figure 14:
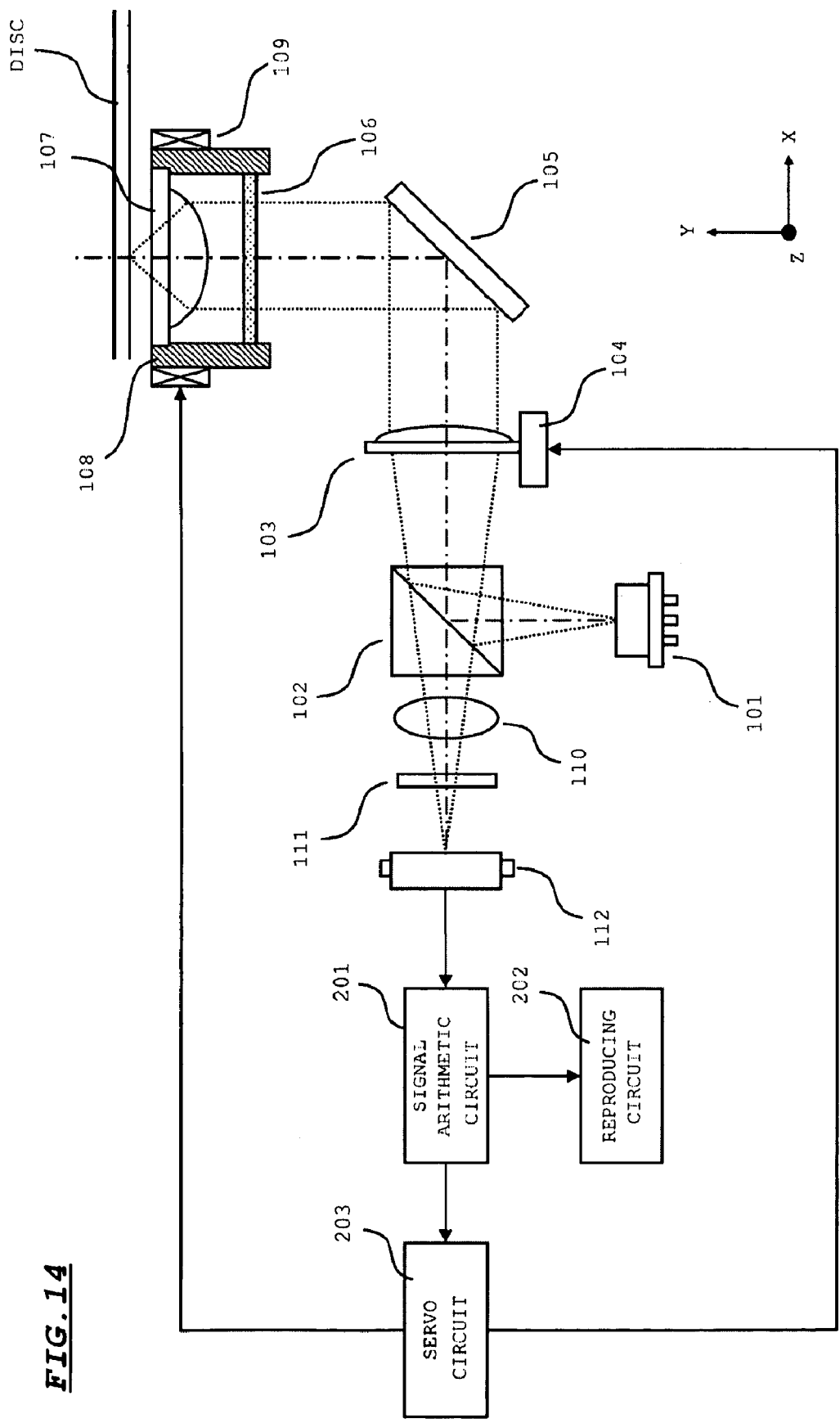
FIG. 14 is a diagram showing an optical system of an optical pickup apparatus according to the embodiment.

FIG. 14 depicts an optical system of the optical pickup apparatus according to the embodiment. It is noted that in FIG. 14, for the sake of convenience, a related circuit configuration is also shown. A plurality of recording layers are stacked and placed on a disc shown in FIG. 14.

As shown in FIG. 14, the optical system of the optical pickup apparatus is provided with: a semiconductor laser 101; a polarizing beam splitter 102; a collimating lens 103; a lens actuator 104; a startup mirror 105; a ¼ wavelength plate 106; an objective lens 107; a holder 108; an objective lens actuator 109; a detection lens 110; an angle adjusting element 111; and a photodetector 112.

The semiconductor laser 101 emits a laser light of a predetermined wavelength. The polarizing beam splitter 102 substantially completely reflects the laser light (S polarized light) entering from the semiconductor laser 101, and at the same time, substantially completely transmits the laser light (P polarized light) entering from the collimating lens 103 side. The collimating lens 103 converts the laser light entering from the polarizing beam splitter 102 side into a parallel light.

The lens actuator 104 displaces the collimating lens 103 in an optical-axis direction according to a servo signal inputted from the servo circuit 203. This corrects a spherical aberration caused in the laser light. The startup mirror 105 reflects the laser light entering from the collimating lens 103 side in a direction towards the objective lens 107.

The ¼ wavelength plate 106 converts the laser light towards the disc into a circularly polarized light, and at the same time, converts a reflected light from the disc into a linearly polarized light perpendicularly intersecting the polarization direction at the time of heading towards the disc. Thereby, the laser light reflected by the disc is transmitted through the polarizing beam splitter 102.

The objective lens 107 is designed such that the laser light is converged properly in a target recording layer within the disc. The holder 108 holds the ¼ wavelength plate 106 and the objective lens 107 as a single piece. The objective lens actuator 109 is configured by a conventionally well-known electromagnetic driving circuit, and out of the circuit, a coil portion, such as a focus coil, is attached to the holder 108.

The detection lens 110 introduces astigmatism into the reflected light from the disc. That is, the detection lens 110 is equivalent to the astigmatic element of FIG. 1A.

The angle adjusting element 111 changes the advancing direction of the laser light entering from the detection lens 110 side according to the manner described with reference to FIGS. 9A and 9B. That is, the angle adjusting element 111 changes the advancing direction of the luminous flux, out of the laser light that has been entered, passing through the luminous flux regions A to D of FIG. 9A by the same angular amount α, in the directions Da to Dd, respectively. It is noted that the angular amount α is set in a manner that the distribution states of the signal light and the stray lights 1 and 2 on the surface S0 result in the distribution states in FIG. 9B.

Figure 15A:
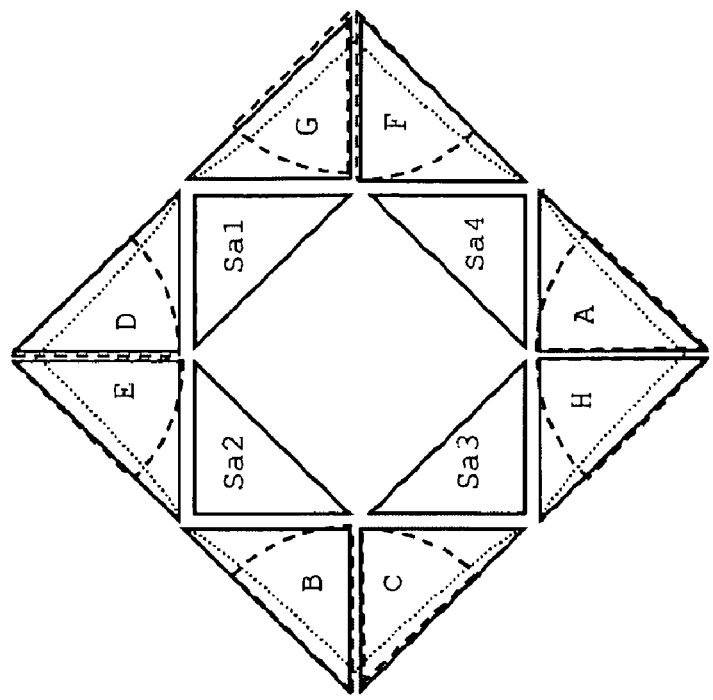
FIG. 15A and FIG. 15B are diagrams each showing a sensor pattern of a photodetector according to the embodiment.

The photodetector 112 has the sensor pattern shown in FIG. 15A. The photodetector 112 is placed in a manner that this sensor pattern is positioned at a location of the surface S0 of FIG. 1A. The eight sensors P11 to P18 shown in FIG. 10D are disposed in the photodetector 112, and each of these sensors receives the luminous flux passing through the luminous flux regions a to h of FIG. 10D. Furthermore, four sensors Sa1 to Sa4 are disposed on an inner side of the eight sensors P11 to P18 in the photodetector 112. It is possible to produce a signal that shows the magnitude and direction of the spherical aberration by performing an arithmetic process on the output signals from the sensors Sa1 to Sa4 as described with reference to FIG. 13A to FIG. 13C.

Figure 15B:
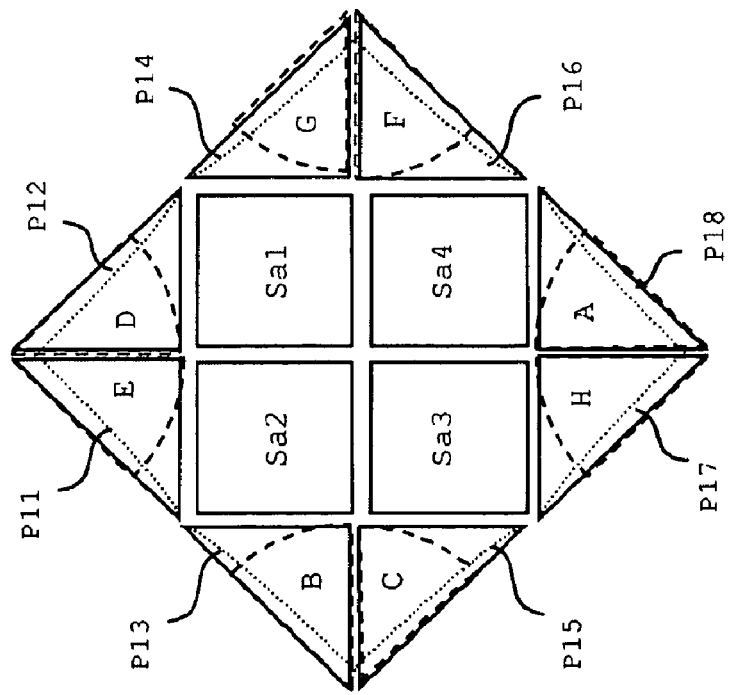

As shown in FIG. 15B, the four sensors Sa1 to Sa4 can be configured to have a triangular profile. In this case also, as seen with reference to FIG. 11A to FIG. 11C, it is possible to detect a deviation in the signal light resulting from the spherical aberration, based on the output signals from the four sensors Sa1 to Sa4. That is, in this case also, as described above, it is possible to produce a signal showing the magnitude and direction of a spherical aberration by performing an arithmetic operation of (Sa1+Sa3)−(Sa2+Sa4) with respect to the output signals from the sensors Sa1 to Sa4.

Returning to FIG. 14, a signal arithmetic circuit 201 performs the arithmetic process, as described with reference to FIG. 10D, on the detection signals outputted from the eight sensors P11 to P18 of the photodetector 112, and generates a focus error signal and a push-pull signal. Furthermore, the signal arithmetic circuit 201 adds up the detection signals outputted from the eight sensors P11 to P18 to generate a reproduction RF signal. Moreover, the signal arithmetic circuit 201 produces a signal (hereafter, referred to as a "spherical aberration signal") showing the magnitude and direction of a spherical aberration by performing an arithmetic process, as described above with reference to FIG. 13A to FIG. 13C, on the detection signals outputted from the four sensors Sa1 to Sa4 of the photodetector 112. The generated focus error signal, push-pull signal, and spherical aberration are sent to a servo circuit 203, and the reproduction RF signal is sent to a reproduction circuit 202 and the servo circuit 203.

The reproduction circuit 202 demodulates the reproduction RF signal inputted from the signal arithmetic circuit 201 so as to generate reproduction data. The servo circuit 203 generates a tracking servo signal and a focus servo signal from the push-pull signal and the focus error signal inputted from the signal arithmetic circuit 201, and outputs these signals to the objective lens actuator 109. Furthermore, the servo circuit 203 produces a servo signal for correcting the spherical aberration from the spherical aberration signal from the signal arithmetic circuit 201 and outputs the servo signal to the lens actuator 104.

Figure 16C:
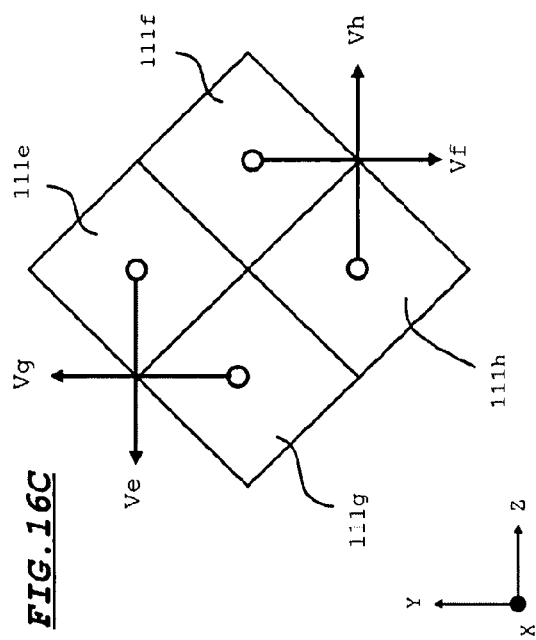
FIG. 16A to FIG. 16C are diagrams each showing a configuration example of an angle adjusting element according to the embodiment.
Figure 16B:
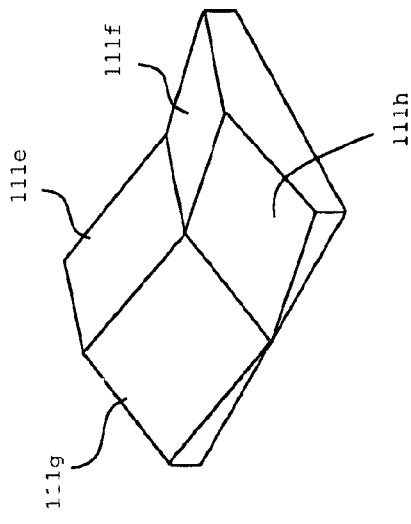
Figure 16A:
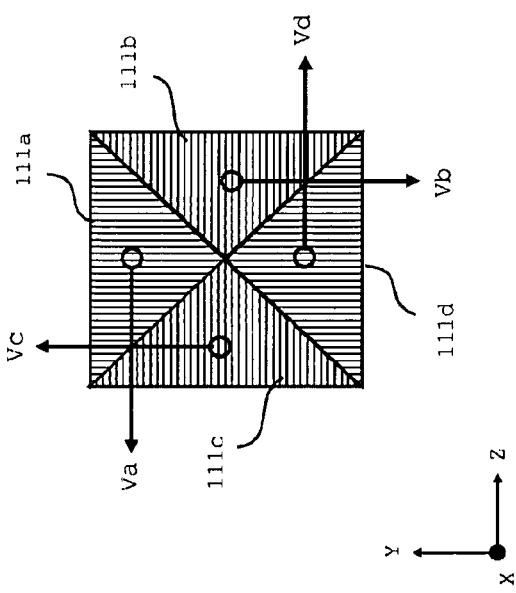

FIGS. 16A to 16C are diagrams each showing a configuration example of the angle adjusting element 111. FIG. 16A shows a configuration example in a case that the angle adjusting element 111 is configured by a hologram element having a diffraction pattern, while FIGS. 16B and 16C show configuration examples in a case that the angle adjusting element 111 is configured by a multi-faced prism.

Firstly, in the configuration example of FIG. 16A, the angle adjusting element 111 is formed by a square-shaped transparent plate, and has a hologram pattern being formed on the light-entering surface. As shown in FIG. 16A, the light-entering surface is sectioned into four hologram regions 111a to 111d. The angle adjusting element 111 is placed after the detection lens 110 so that the laser light (the signal light and the stray lights 1 and 2) passing through the luminous flux regions A to D of FIG. 9A enters in each of the hologram regions 111a to 111d.

The hologram regions 111a to 111d diffract the entered laser light (the signal light and the stray lights 1 and 2) in directions Va to Vd, respectively. The directions Va to Vd coincide with the directions Da to Dd of FIG. 9A. Thus, by means of diffraction, the hologram regions 112a to 112d change the advancing direction of the laser light (the signal light and the stray lights 1 and 2) entering from the polarization adjusting element 111 to the directions Da to Dd of FIG. 9A, respectively. A diffraction angle in each region is the same.

Herein, the diffraction angle is so adjusted that the laser light (the signal light and the stray lights 1 and 2) passing through the hologram regions 111a to 111d is distributed as shown in FIG. 9B, on the surface S0 of FIG. 1A. Thus, as described above, if the light-receiving surface of the photodetector 112 having the sensor pattern shown in FIG. 15A is placed on the surface S0, the corresponding signal light can be received properly by the aforementioned eight sensors P11 to P18.

It is noted that the diffraction efficiency of the hologram regions 111a to 111d is the same as one another. If the hologram formed in the hologram regions 111a to 111d is of a step-like structure, the diffraction efficiency is adjusted by the number of steps of the hologram pattern and the height for each step, and the diffraction angle is adjusted by a pitch of the hologram pattern. Therefore, in this case, the number of steps of the hologram pattern and the height for each step are set so that the diffraction efficiency of a previously determined diffraction order reaches an expected value, and also, the pitch of the hologram pattern is adjusted so that the diffraction angle in the diffraction order can provide the distribution shown in FIG. 9B.

It is noted that the hologram formed in the hologram regions 111a to 111d can also be of a blaze type. In this case, a higher diffraction efficiency can be achieved as compared to the step-like structured hologram.

In the configuration example of FIG. 16B, the angle adjusting element 111 is formed by a transparent body whose light-emitting surface is plane, and the light-entering surface is individually inclined in different directions in four regions. FIG. 16C is a view of FIG. 16B as seen from the light-entering surface side. As shown in FIG. 16C, on the light-entering surface of the angle adjusting element 111, four inclined surfaces 111e to 111h are formed. If a light ray enters these inclined surfaces from the light-entering surface side, in parallel to an X-axis, the advancing direction of the light will change in the direction of Ve to Vh shown in FIG. 16C, respectively, due to the refractive effect caused when the light enters the inclined surfaces 111e to 111h. Herein, the refraction angle in the inclined surfaces 112e to 112h is the same.

The angle adjusting element 111 of FIG. 16B is placed after the detection lens 110 so that the laser light (the signal light and the stray lights 1 and 2) passing through the luminous flux regions A to D of FIG. 9A enters the inclined surfaces 111e to 111h, respectively. If the angle adjusting element 111 is placed in this way, the refraction directions Ve to Vh on the inclined surfaces 111e to 111h coincide with the directions Da to Dd of FIG. 9A. Therefore, by means of the refraction, the inclined surfaces 111e to 111h change the advancing direction of the laser light (the signal light and the stray lights 1 and 2) entering from the detection lens 110 by a constant angle into the directions Da to Dd of FIG. 9A, respectively.

Herein, the refraction angle on each inclined surface is adjusted in a manner that the laser light (the signal light and the stray lights 1 and 2) passing through the inclined surfaces 111e to 111h is distributed as shown in FIG. 9B, on the surface S0 of FIG. 1A. Thus, if the photodetector 112 having the sensor pattern shown in FIG. 15A is placed on the surface S0, the corresponding signal light can be received properly by the aforementioned eight sensors P11 to P18. Because such a refractive effect has a significantly small dependency on the wavelength as compared to the diffractive effect, the adaptability to a change in the wavelength of a light source or to a multi-wavelength light source is high.

It is noted that in the configuration example of FIG. 16A, the hologram regions 111a to 111d are imparted with only the diffractive effect of providing an angle for changing the advancing direction of the laser light by a constant angle. However, besides providing the angle, a hologram pattern that simultaneously exhibits an astigmatic effect caused by the detection lens 110 can also be set to the hologram regions 111a to 111d. Furthermore, it may be also possible that a hologram pattern for providing the aforementioned angle is formed on the light-entering surface of the angle adjusting element 111 and the light-emitting surface of the angle adjusting element 111 is imparted with the hologram pattern for imparting the astigmatic effect. Similarly, also in the angle adjusting element 111 of FIG. 16B, a lens surface may be formed on the light-emitting surface for introducing astigmatism. Alternatively, the inclined surfaces 111e to 111h can be shaped into curved surfaces, and the inclined surfaces 111 to 111h may be imparted with an astigmatic lens effect. In this way, the detection lens 110 can be omitted, and reductions in the number of parts and in cost can be achieved.

Thus, according to the embodiment, from among recording layers disposed in the disc, the overlapping between the signal light reflected from the target recording layer, and the stray lights 1 and 2 reflected from the recording layers present above and below the target recording layer can be prevented from overlapping one another on the light-receiving surface (the surface S0 where the signal light spot becomes a circle of least confusion at the time of on-focus) of the photodetector 112. More specifically, the distribution of the signal light and the stray lights 1 and 2 on the light-receiving surface (surface S0) can be made as shown in FIG. 9B. Therefore, by placing the sensor pattern shown in FIG. 15A in the signal light region of FIG. 9B, only the corresponding signal light can be received by the sensors P11 to P18. Thus, the degradation of the detection signal due to the stray light can be inhibited. Furthermore, this effect is achieved only by placing the angle adjusting element 111 in a light path of the laser light reflected by the disc, i.e., between the detection lens 110 and the photodetector 112 in terms of the configuration in FIG. 14. Therefore, according to the embodiment, an influence caused due to the stray light can be removed effectively with a simple configuration.

In addition, the present embodiment enables the detection of the magnitude and direction of a spherical aberration by a simple configuration in which the four sensors Sa1 to Sa4 are disposed on an inner side of the sensors P11 to P18. Although a variation in the laser wave length, a change in the temperature of the respective lenses, etc., can be suggested as causes of the generation of the spherical aberration in addition to the above-described cover thickness error, the use of the above-described detecting method enables detection of spherical aberrations generated by these causes. Furthermore, the spherical aberration can be corrected by the use of a liquid crystal element, a deformable mirror, etc., in addition to the use of the lens actuator described above.

Figure 17:
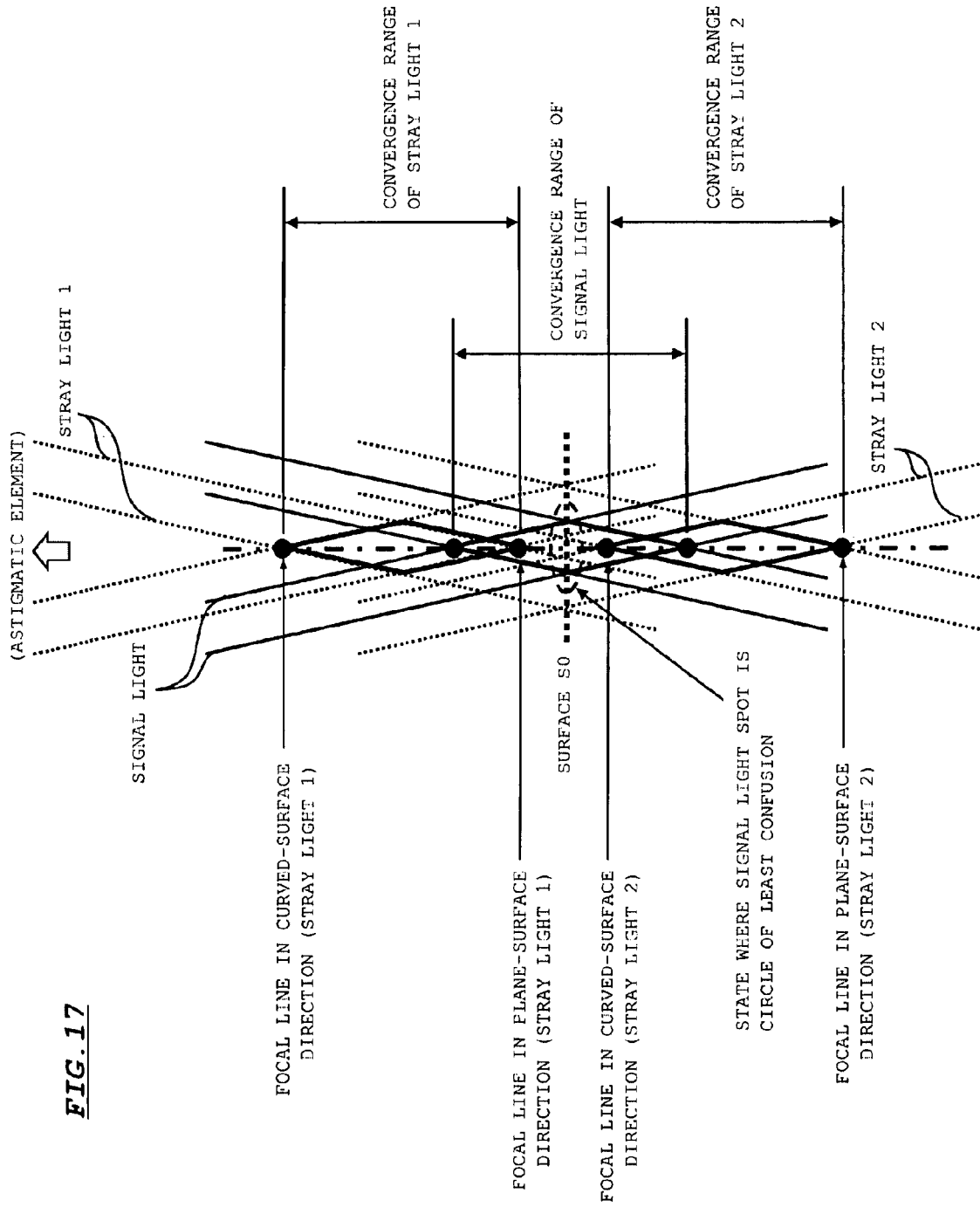
FIG. 17 is a diagram showing a preferred applicable range of a technical principle of the embodiment and the present invention.

It is noted that as shown in FIG. 17, the effect by the aforementioned principle can be demonstrated when the focal line position of the stray light 1 in the plane-surface direction is closer to the astigmatic element than the surface S0 (the surface where the signal light spot becomes a circle of least confusion), and the focal line position of the stray light 2 in the curved-surface direction is further away from the astigmatic element than the surface S0. That is, when this relationship is fulfilled, the distribution of the signal light and the stray lights 1 and 2 becomes the same state as those shown in FIGS. 8A to 8D, and the overlapping between the signal light, and the stray lights 1 and 2 on the surface S0 can be prevented. In other words, as long as this relationship is fulfilled, for example, even if the focal line position of the stray light 1 in the plane-surface direction is closer to the surface S0 than the focal line position of the signal light in the curved-surface direction, or else, even if the focal line position of the stray light 2 in the curved-surface direction is closer to the surface S0 than the focal line position of the signal light in the plane-surface direction, the effects of the present invention and the embodiment based on the aforementioned principle can be demonstrated.

The embodiment of the present invention is thus described above. However, the present invention is not limited thereto, and the embodiment of the present invention can also be modified in various ways apart from the aforementioned description.

Figure 18A:
FIG. 18A to FIG. 18D are diagrams each showing a modified example (setting mode of a luminous flux region) of the embodiment.

For example, in the aforementioned embodiment, the advancing direction of the luminous flux passing through the luminous flux regions A to D is changed to the directions Da to Dd of FIG. 9A. However, as shown in FIG. 18A, the advancing direction may also be changed to a random direction, or may also be changed in the same direction by providing a change to the angular amount. In brief, the luminous flux passing through the luminous flux regions A to D may be dispersed in a manner that the stray light region from the other luminous flux regions is not located on each signal light region of the luminous flux regions A to D shown in FIG. 8A to 8D. In this way, it becomes possible to receive only the respective signal lights by the corresponding sensors, thereby removing the influence of the stray light.

When the propagation direction of the light flux passing through the light flux regions A to D is thus changed, according thereto, a suitable adjustment needs to be made to the placement of the sensors Sa1 to Sa4 for detecting a spherical aberration. In this case also, similarly to the above-described case, the sensors Sa1 to Sa4 for detecting a spherical aberration are placed in a position enabling detection of the direction and magnitude of a spherical aberration from the difference between the additional value of the output signals from the sensors Sa1 and Sa3 and the additional value of the output signals from the sensors Sa2 and Sa4.

Figure 18B:
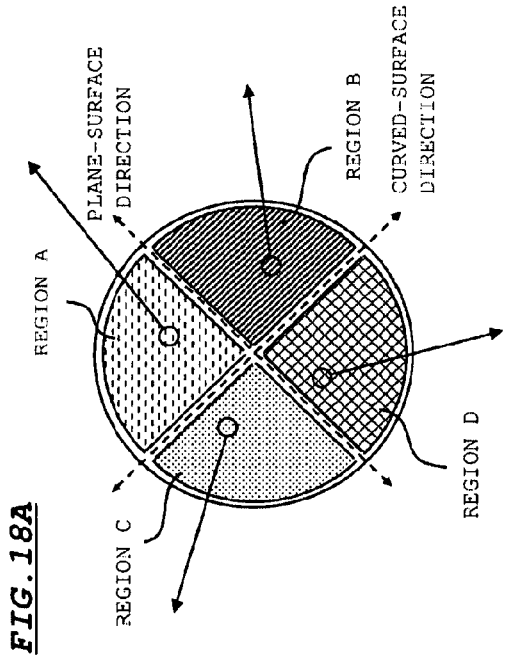
Figure 18C:
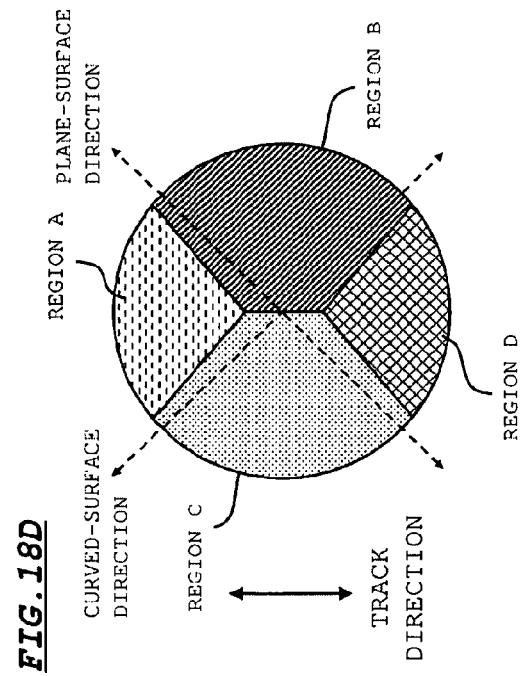
Figure 18D:
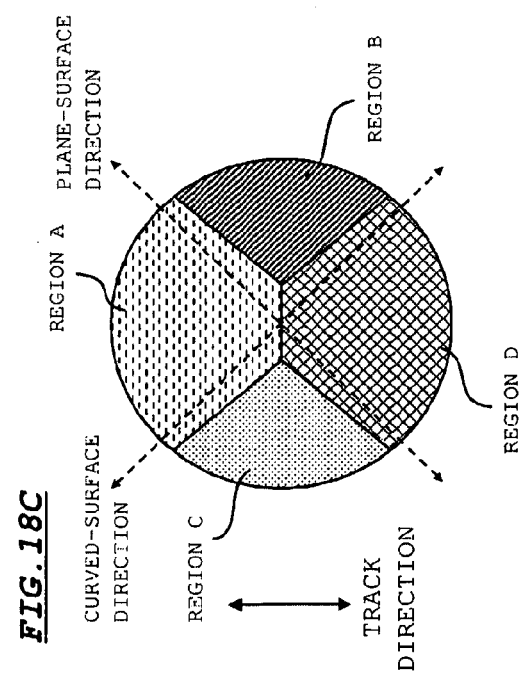

Furthermore, in the aforementioned embodiment, as shown in FIG. 7A, the laser light is uniformly split into four parts, and the luminous flux regions A to D are set, however, as shown in FIG. 18B, the luminous flux regions A to D may also be set so as not to be located on a 2-parting line in the plane-surface direction and a 2-parting line in the curved-surface direction. Alternatively, as shown in FIGS. 18C and 18D, out of the two luminous flux regions positioned in a direction in which vertical angles created by these two 2-parting lines form a line, only the luminous flux regions C and B may be set so as not to be located on these two 2-parting lines (see FIG. 18C), or only the luminous flux regions A and D may be set so as not to be located on two 2-parting lines (see FIG. 18D). It is noted that in FIGS. 18C and 18D, because the stray light component of a part protruding out from the parting lines is superposed on the signal light, the detection signal is slightly degraded, as compared to the aforementioned embodiment. Also, because shapes of the luminous flux regions A to D change as compared to the aforementioned embodiment, shapes of the sensors need to be adjusted according thereto.

Figure 19:
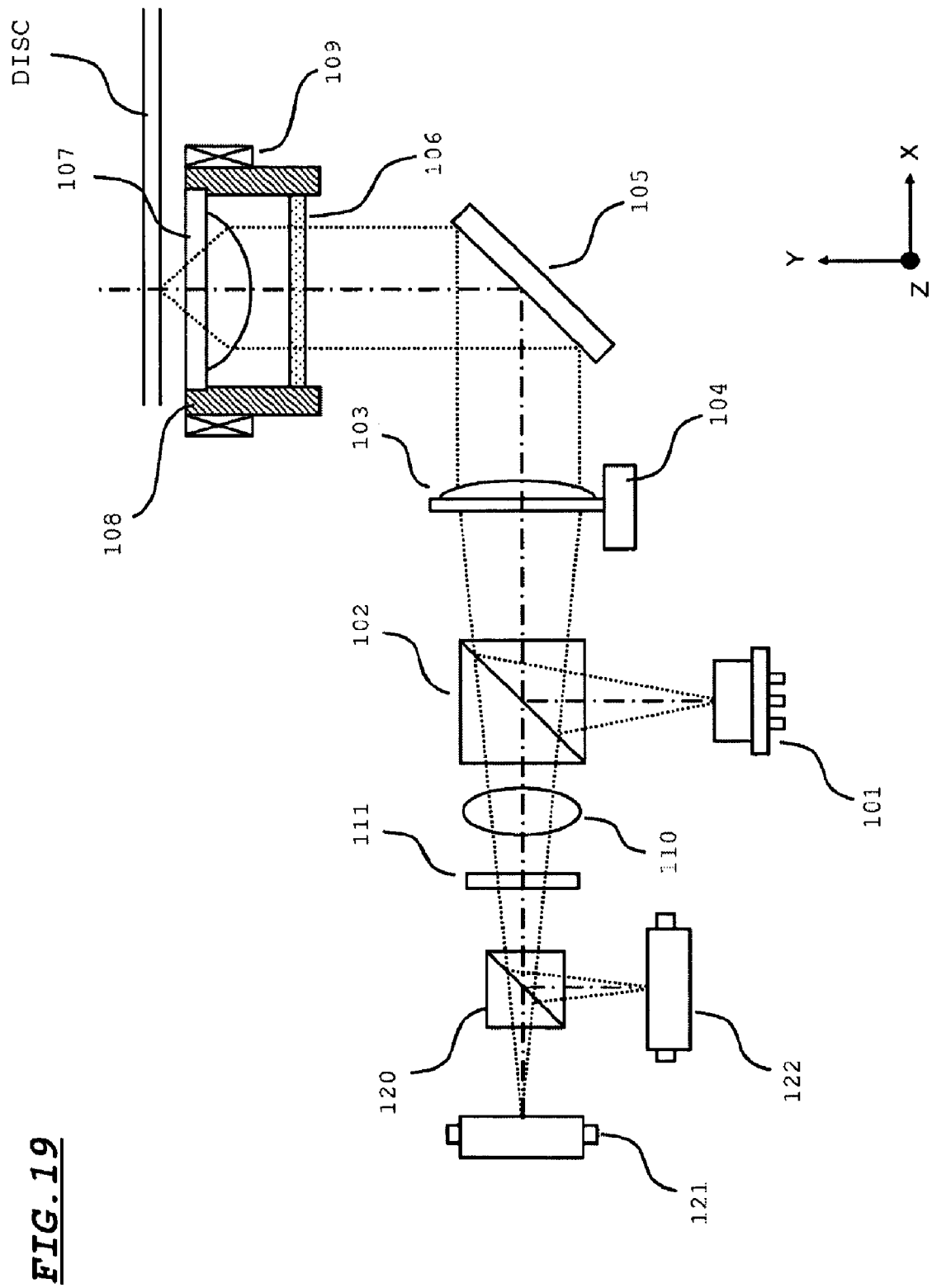
FIG. 19 is a diagram showing a modified example (modified mode of an optical system) of the embodiment.

Moreover, in the configuration shown in FIG. 14, the signal light is received by a single photodetector 112. For example, as shown in FIG. 19, the optical system can be modified so that the laser light transmitting the angle adjusting element 111 is split by a non-polarizing beam splitter (half mirror or the like) 120 and the split laser light is received respectively by two photodetectors 121 and 122. In this case, a sensor pattern (sensors P11 to P18) as shown in FIG. 10D is disposed on the photodetector 121 and a sensor pattern formed only of the four sensors Sa1 to Sa4 as shown in FIG. 15A or FIG. 15B is disposed on the photodetector 122.

In the configuration example shown in FIG. 19, the angle adjusting element 111 is placed on a front stage of the non-polarizing beam splitter 120. However, the angle adjusting element 111 can be omitted, and instead, two angle adjusting elements for producing the distribution in FIG. 9B on the photodetectors 121 and 122 may be disposed in the light path between the non-polarizing beam splitter 120 and the photodetector 121 and in the light path between the non-polarizing beam splitter 120 and the photodetector 122. It should be noted that in the configuration example in FIG. 19, the light path for the laser light is isolated by using the non-polarizing beam splitter 120. However, the light path may also be isolated by using a combination of a ½ wave-length plate and a polarizing beam splitter or a diffraction grating.

It is noted that in the aforementioned embodiment, the angle adjusting element 111 is placed between the detection lens 110 and the non-polarizing beam splitter 120. However, the angle adjusting element may be placed at an arbitrary position in an optical path between the objective lens 107 and the photodetector 112. However, when the angle adjusting element is placed at a position overlapping the optical path of the laser light towards the objective lens 107, the angle adjusting element needs to be so configured that the angle adjusting effect is not imparted to the laser light towards the objective lens 107. For example, when the angle adjusting element is configured as shown in FIG. 16A, a hologram element dependent on the polarized light is used as the angle adjusting element. That is, the hologram element is so configured that instead of exhibiting the diffractive effect in the polarization direction of the laser light at the time of heading towards the objective lens 107, the diffractive effect is exhibited in the polarization direction of the laser light that is returning from the objective lens 107.

Figure 20:
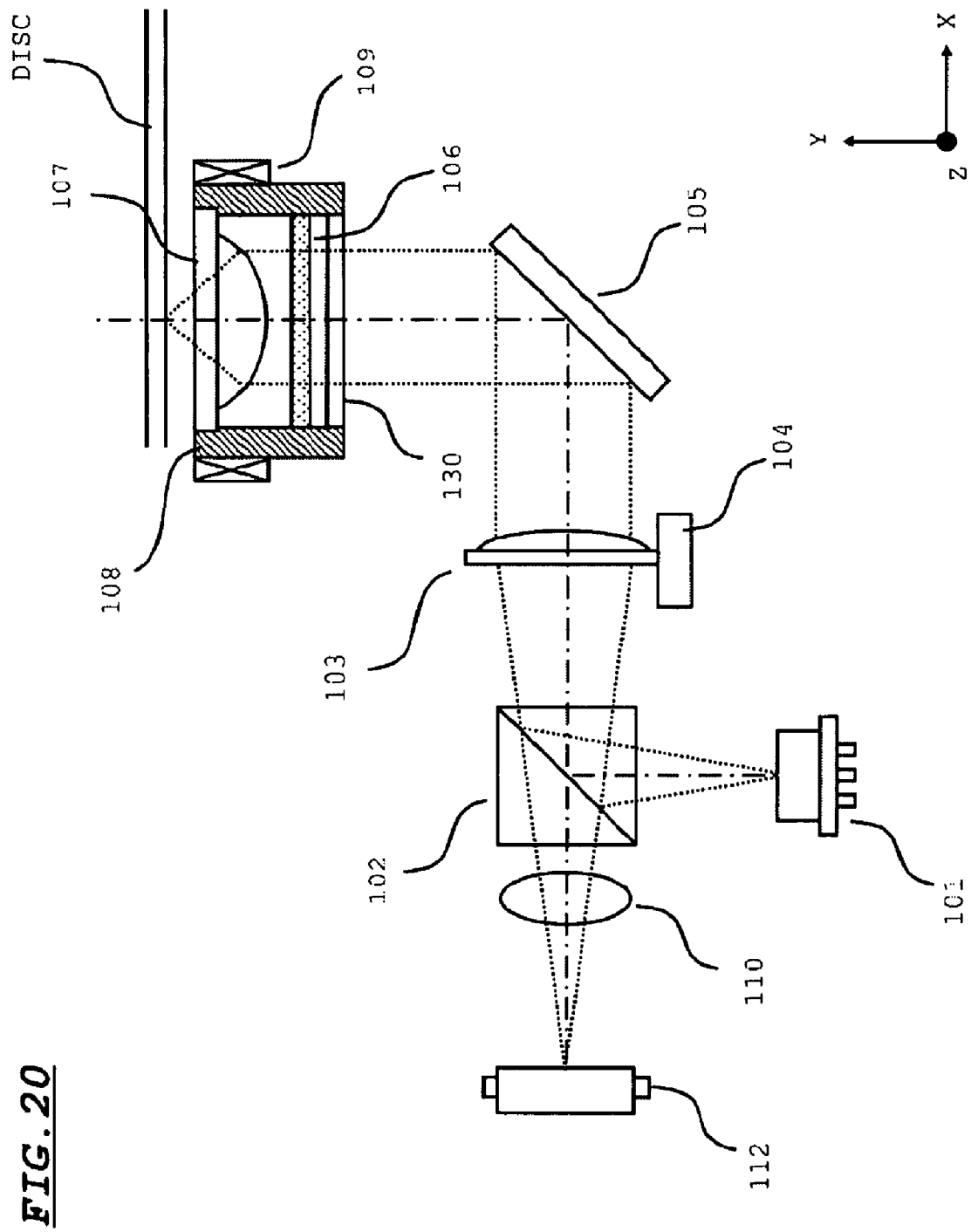
FIG. 20 is a diagram showing a modified example (modified mode of an optical system) of the embodiment.

FIG. 20 is a diagram showing the configuration example in this case. In this configuration example, an angle adjusting element 130 configured by a hologram element dependent on the polarized light is attached to a holder 108. The angle adjusting element 130 does not exhibit the diffractive effect in the laser light (S polarized light) at the time of heading towards the objective lens 107, but exhibits the diffractive effect in the laser light (P polarized light) that is returning from the objective lens 107. In this case, an angle-changing effect for the luminous flux regions A to D is similar to that of FIG. 16A. However, because the length of the optical path between the light-receiving surface of the photodetector 112 and the angle adjusting element 130 is longer than that in the aforementioned embodiment, an angular amount required to change the advancing direction of the laser light becomes smaller as compared to the aforementioned embodiment.

In this configuration example, the angle adjusting element 130 is attached to the holder 108, and therefore, even if the objective lens 107 deviates in a tracking direction, no relative center deviation occurs in the angle adjusting element 160 relative to the return light from the objective lens 107 (reflected light from the disc). Therefore, it is possible to inhibit the degradation of the detection signal caused due to the deviation of the optical axis at the time of a tracking operation.

When the four sensors Sa1 to Sa4 as shown in FIG. 15A are placed on an inner side of the sensors P11 to P18 as described in the above embodiment, a coma aberration can be detected in addition to the spherical aberration, based on the output signals from the sensors Sa1 to Sa4.

FIG. 21A(b), FIG. 21B(b), and FIG. 21C(b) show simulation results obtained by performing a simulation to evaluate the influence of a coma aberration occurring in a signal light on a light detecting surface. FIG. 21B(b) shows a state of a signal light when a laser light axis L0 is set orthogonal to a disc surface (assuming a Blu-ray disc), as shown in FIG. 21B(a), (when a coma aberration is not generated). FIG. 21A(b) and FIG. 21C(b) show states of a signal light when a coma aberration is generated with a disc being inclined in a radial direction as shown in FIG. 21A(a) and FIG. 21C(a), respectively.

In FIG. 21A(b), FIG. 21B(b), and FIG. 21C(b), the closer to black, the greater the light intensity. FIG. 21A(b) shows simulation results obtained when a disc is inclined counter-clockwise from a state shown in FIG. 21B(a) by 0.5 degrees in a radial direction so that a magnitude of the three-dimensional coma aberration is 30 mλrms. FIG. 21C(b) shows simulation results obtained when the disc is inclined clock-wise from a state shown in FIG. 21B(a) by 0.5 degrees in a radial direction so that a magnitude of the three-dimensional coma aberration is 30 mλrms.

The results in FIG. 21A(b), FIG. 21B(b) and FIG. 21C(b) were obtained by using the optical system shown in FIG. 12. In this simulation also, single recording layers are assumed to be present one each before and after the target recording layer. Intervals between the target recording layer and the recording layers present before and after the target recording layer are 10 μm, respectively. In FIG. 21A(b), FIG. 21B(b), and FIG. 21C(b), similarly to the case of FIG. 11A to FIG. 11C, a signal light in a range of equal to or more than 1/200 and equal to or less than 1/100 of a peak intensity is plotted in gray and a signal light in a range of equal to or more than that intensity is plotted in black.

With reference to FIG. 21B(b), when a tilt is not generated in the disc, the intensities of the four signal lights SL, SR, SU, and SB on the light detecting surface are equal to one another and the intensity distribution of the signal light on the light detecting surface is in a balanced state relative to the transverse and vertical directions in FIG. 21B(b). In this case, as shown in FIG. 21B(b), when light receiving regions AL and AR are set to symmetrical transverse positions within the signal light regions, amounts of signal light received in the light receiving regions AL and AR are equal to each other. Thus, when sensors are respectively placed in the light receiving regions AL and AR, a difference in the signals outputted from each sensor pattern is zero.

Subsequently, with reference to FIG. 21A(b), when a counterclockwise tilt is generated in the disc, the intensity of the signal light SR becomes greater than that of the signal light SL and the side lobe of the signal light SR becomes greater than the side lobe of the signal light SL. In this case, an amount of signal light received in the light receiving region AR becomes greater than that received in the light receiving region AL. Therefore, when sensors are respectively placed in the light receiving regions AL and AR and the output signals from the respective sensors are denoted as SAL and SAR, SAL−SAR<0 is established.

Moreover, with reference to FIG. 21C(b), when a clockwise tilt is generated in the disc, the intensity of the signal light SL becomes greater than that of the signal light SR. Furthermore, the side lobe of the signal light SL becomes larger than the side lobe of the signal light SR. Since the amount of signal light received in the light receiving region AL is larger than that received in the light receiving region AR in this case, when sensors are respectively placed in the light receiving regions AL and AR and the output signals from the respective sensors are denoted as SAL and SAR, SAL−SAR>0 is established.

In this manner, when the light receiving regions AL and AR are set to symmetrical transverse positions within a signal light region and sensors are placed in the light receiving regions AL and AR, the direction and magnitude of the disc tilt can be detected from a difference in the output signals from the sensors.

Figure 22A:
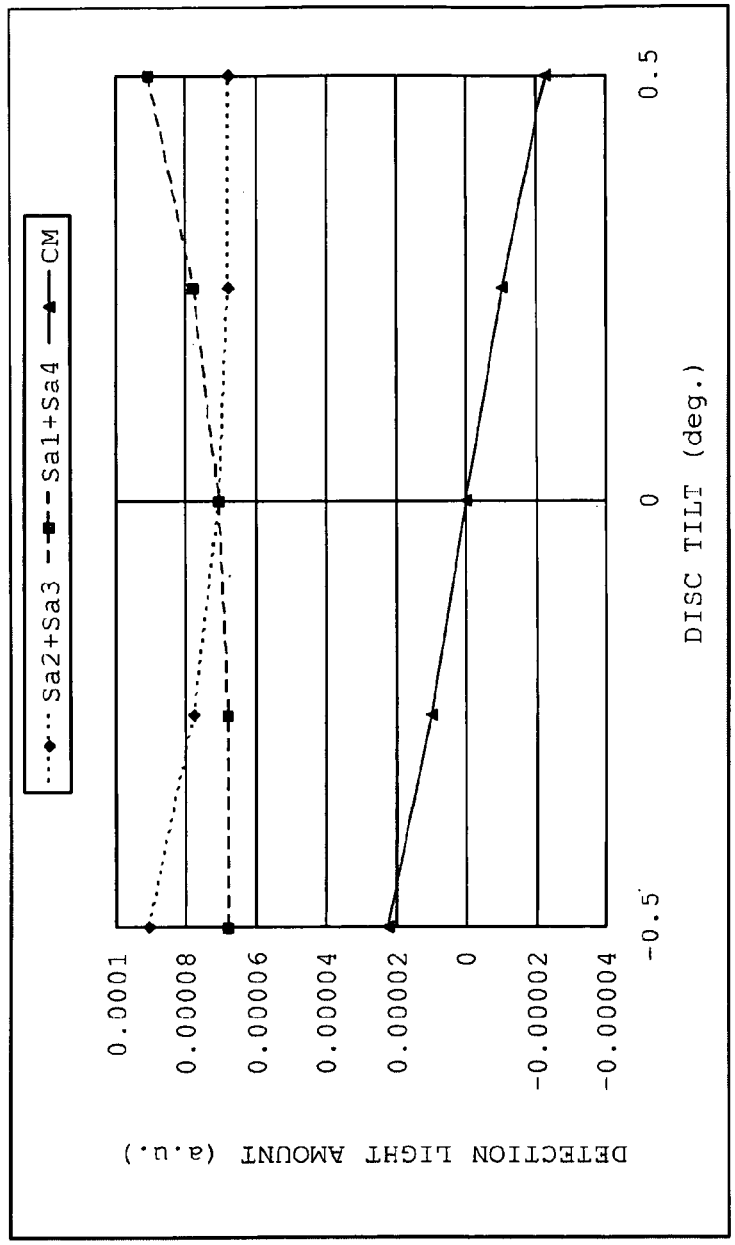
FIG. 22A to FIG. 22C are diagram each showing simulation results relating to influences of a spherical aberration according to the embodiment.

FIG. 22A shows simulation results, under the above-described simulation conditions, obtained by simulating a change of amounts of light received in the light receiving regions AL and AR when an inclination angle (disc tilt) of the disc surface to the laser light axis L0 is changed.

A horizontal axis of FIG. 22A is so scaled that the inclination angle (disc tilt) in a state shown in FIG. 21B(a) (a state in which the laser light axis is orthogonal to the disc surface) is zero, and from this state, for example as shown in FIG. 21A(a), an inclination angle (disc tilt) obtained when the disc is inclined counterclockwise in a disc radial direction is taken to be positive. Furthermore, a vertical axis in FIG. 22A shows an amount of signal light received on the signal detecting surface of the photodetector 17.

Figure 22C:
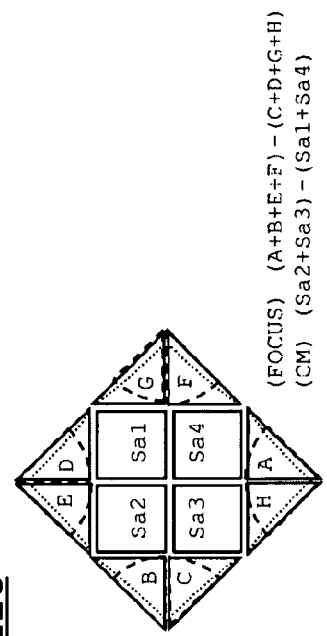
Figure 22B:
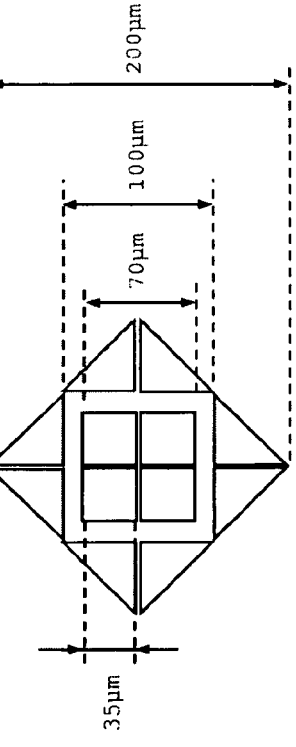

In this simulation, a sensor pattern having the dimensions shown in FIG. 22B (the same as the preceding FIG. 13B) is placed on a signal detecting surface of the photodetector 17. FIG. 22A shows the arithmetic results obtained when an arithmetic operation of Sa2+Sa3 and Sa1+Sa4 is performed on the amounts of signal light (in the same manner as above for the sake of convenience, the amounts of light received in Sa1 to Sa4 are expressed as Sa1 to Sa4) received by four central sensors Sa1 to Sa4 (see FIG. 22C), and also, the arithmetic results obtained from CM=(Sa2+Sa3)−(Sa1+Sa4) as parameter values showing a magnitude of the coma aberration (CM). The sensors Sa2 and Sa3 are placed in the light receiving region AL in FIG. 21A(b), FIG. 21B(b), and FIG. 21C(b) and the sensors Sa1 and Sa4 are placed in the light receiving region AR in FIG. 21A(b), FIG. 21B(b), and FIG. 21C(b).

As seen from the simulation results, as described above, when the light receiving regions AL and AR are set to symmetrical transverse positions within the signal light regions and the sensors Sa2 and Sa3 and sensors Sa1 and Sa4 are placed respectively in the light receiving regions AL and AR, the direction and magnitude of the coma aberration, i.e., the direction and magnitude of the disc tilt can be detected by using a difference between an additional value of the output signals from the sensors Sa2 and Sa3 and an additional value of the output signals from the sensors Sa1 and Sa4.

In addition to the spherical aberration, when the coma aberration is also detected based on the output signals from the sensors Sa1 to Sa4 in this way, the signal arithmetic circuit 201 shown in FIG. 14 performs an arithmetic operation of SA=(Sa1+Sa3)−(Sa2+Sa4) on the output signals from the sensors Sa1 to Sa4 and also an arithmetic operation of CM=(Sa2+Sa3)−(Sa1+Sa4) in order to detect the direction and magnitude of the disc tilt. The servo circuit 203 produces a tilt servo signal based on a tilt error signal (CM) inputted from the signal arithmetic circuit 201 and supplies the produced signal to the objective lens actuator 109.

The objective lens actuator 109 inclines the objective lens 107 in a disc radial direction in response to the supplied tilt servo signal. In this manner, the coma aberration occurring in the inclined objective lens 107 cancels out the coma aberration occurring by the inclination of the disc and therefore the coma aberration is corrected. In this case, the objective lens actuator 109 needs to be so configured to be capable of driving the objective lens 107 in a tilt direction in addition to a focus direction and a tracking direction.

In this manner, when a sensor pattern of the photodetector 112 is set as shown in FIG. 15A, disc tilt (coma aberration) can also be detected in addition to the spherical aberration. Thus, when the optical pickup apparatus is adapted for the disc tilt (coma aberration), it is preferred that the sensor pattern for the photodetector 112 is set as shown in FIG. 15A rather than as in FIG. 15B.

It should be noted that herein, an example has been used above of the coma aberration when the disc surface is inclined in the disc radial direction relative to the laser light axis (radial tilt), the present invention, however, can also be applied in the same manner to a coma aberration when the disc surface is inclined in a track tangent line direction relative to the laser light axis (tangential tilt). In this case, the intensity distribution of the signal light shown in FIG. 21A(b), FIG. 21B(b), and FIG. 21C(b) is out of balance between the signal light SU and the signal light SB. Therefore, the two light receiving regions for detecting a coma aberration are changed to a symmetrical vertical placement from the symmetrical transverse placement (AL and AR) as shown in FIG. 21A(b), FIG. 21B(b), and FIG. 21C(b). When the sensor pattern is configured as shown in FIG. 15A, both a signal expressing a coma aberration due to radial tilt and a signal expressing a coma aberration due to tangential tilt can be produced by performing an arithmetic operation on the signals Sa1 to Sa4.

Moreover, in the above-described example, the objective lens actuator 109 is used as means for correcting the coma aberration. However, it is possible to use other means including a wavefront correcting element, such as a liquid crystal element, capable of dynamically adjusting a wavefront state in laser light in response to a control signal. The coma aberration can take place by inclination of the objective lens or other lens elements or by any other similar phenomena in addition to the inclination (tilt) of the disc. When the wavefront correcting element is used, smooth adaptation is enabled to coma aberration which results from these causes.

Optical Disc Apparatus

More particularly, the optical disc apparatus may be configured as shown below. In the description below, an optical disc apparatus for reproducing an optical disc having a plurality of recording layers is illustrated.

Figure 23:
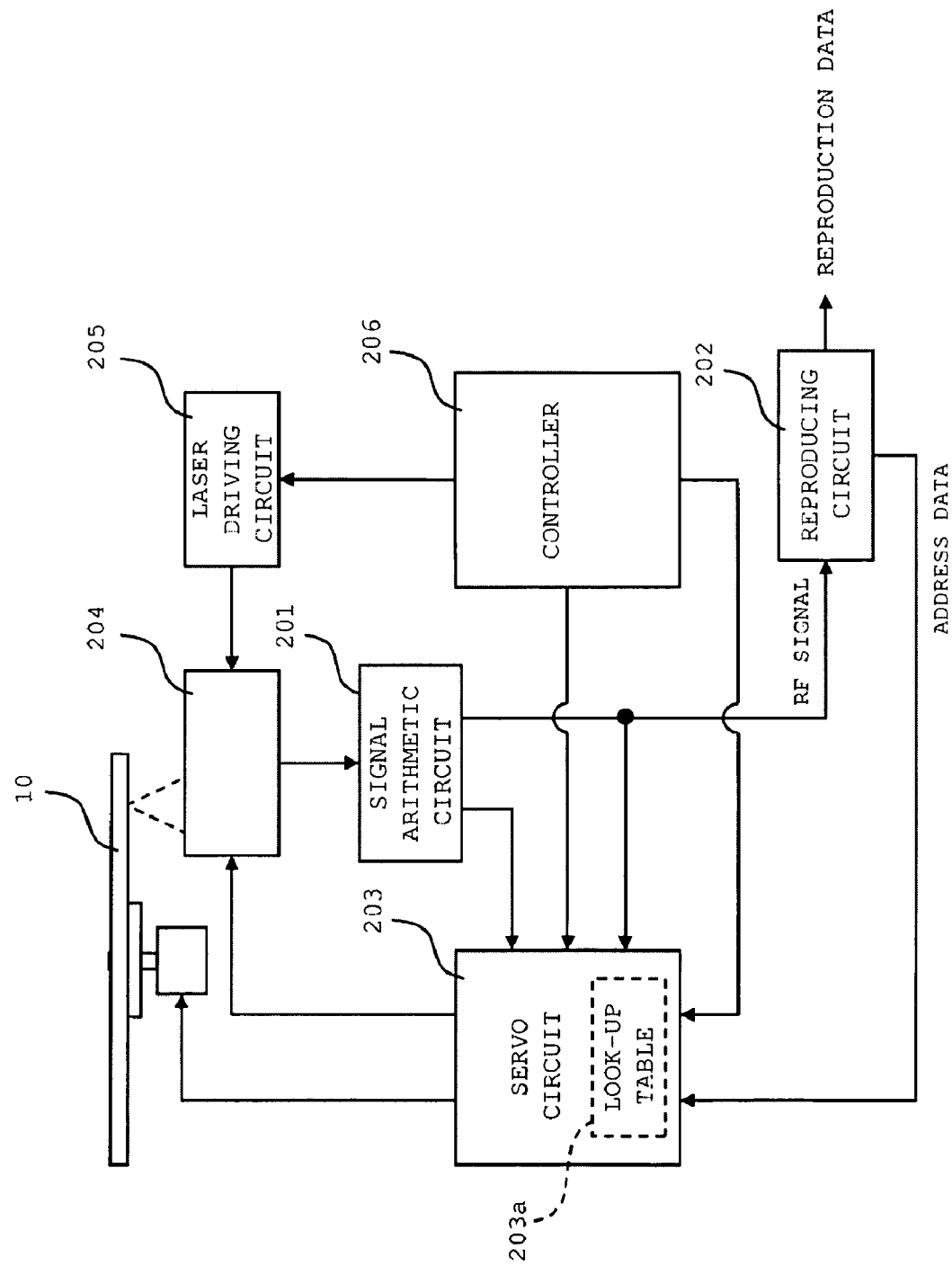
FIG. 23 is a diagram showing the configuration of an optical disc apparatus according to the embodiment.

FIG. 23 is a diagram showing the configuration of relevant parts of the optical disc apparatus. As shown in FIG. 23, the optical disc apparatus is provided not only with the signal arithmetic circuit 201, the reproducing circuit 202, and the servo circuit 203 shown in FIG. 14 but also with an optical pickup apparatus 204, a laser driving circuit 205, and a controller 206. The disc 10 has a plurality of recording layers in a stacking direction. Each recording layer is formed with a track in spiral form. When the track is wobbled in a radial direction, for example, address information is held.

The optical pickup apparatus 204 is provided with the optical system as shown in FIG. 14. The laser driving circuit 205 drives a semiconductor laser 101 disposed within the optical pickup apparatus 204 according to a command from the controller 206. The controller 206 is provided with a CPU and a memory, and controls each component according to a program accommodated in the memory.

The servo circuit 203 is provided with a CPU and a memory, and controls each component according to a program accommodated in the memory. Besides, the servo circuit 203 is provided with a circuit, etc., show in FIG. 25. The servo circuit 203 holds a table (look-up table 203a) on which each recording layer on the disc 10 and a setting position (step count of a stepping motor) of the collimate lens 103 are associated. In this case, the setting position is a position of the collimate lens 103. That position is previously so set that when the laser light is converged onto the corresponding recording layer, the spherical aberration is most suppressed. The look-up table 203a is referenced at the time of performing an aberration correction on the collimate lens 103, as described later.

The servo circuit 203 is inputted address data indicating a reproducing position on the disc, from the reproducing circuit 202. The servo circuit 203 references the address data to determine a change amount of the reproducing position in a disc radial direction, and as described later, executes a servo operation on the collimate lens 103.

Figure 24:
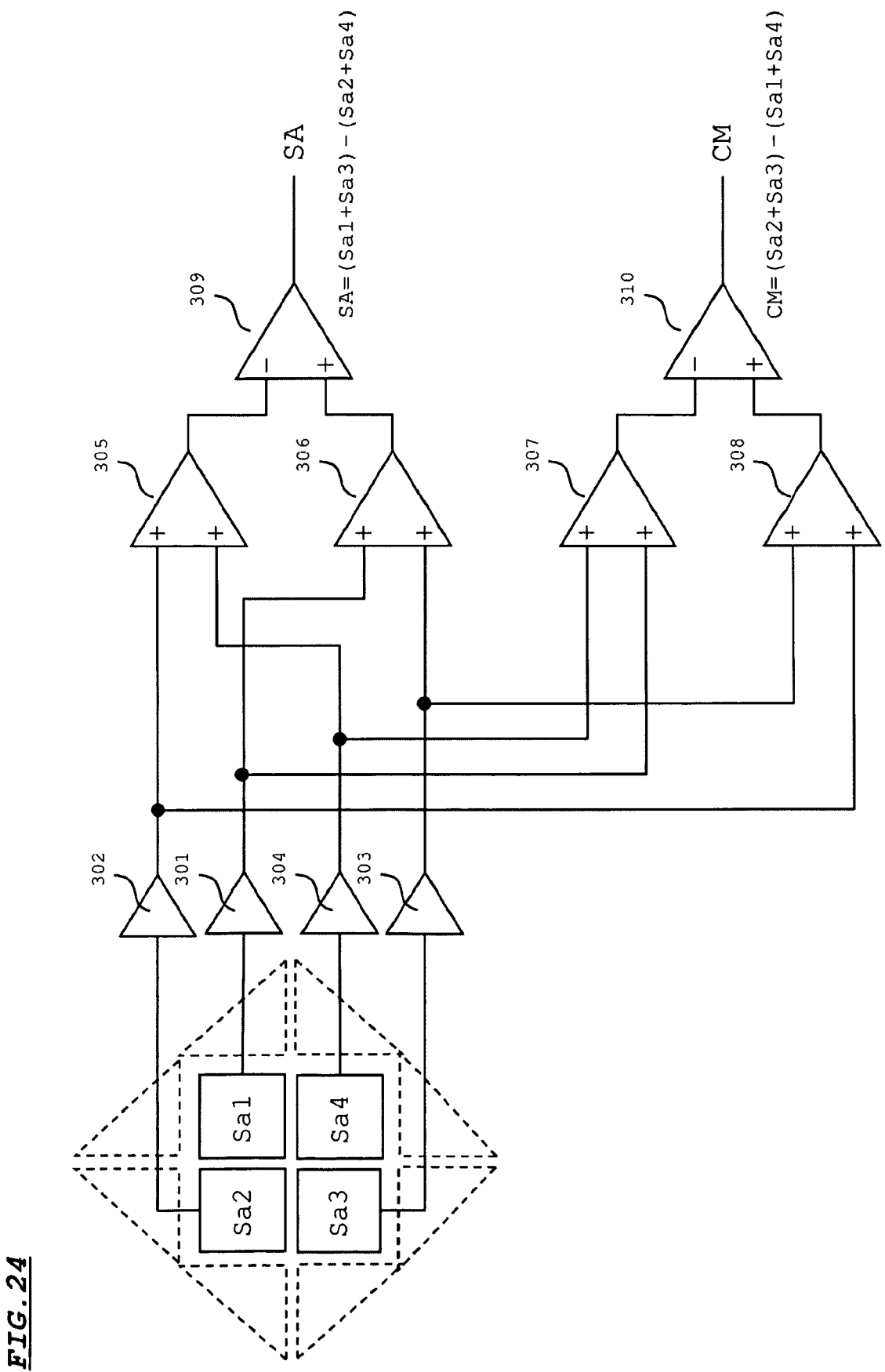
FIG. 24 is a diagram showing the configuration of a signal arithmetic circuit according to the embodiment.

FIG. 24 is a diagram showing a circuit configuration, out of the configuration of the signal arithmetic circuit 201, for producing a signal relating to the spherical aberration (spherical aberration signal) SA and a signal relating to the coma aberration (tilt error signal) CM. For the sake of convenience, FIG. 24 shows the sensors Sa1 to Sa4 shown in FIG. 15A.

As illustrated in FIG. 24, the signal arithmetic circuit 201 is provided with four I/V amps 301 to 304, four adding circuits 305 to 308, and two subtracting circuits 309 and 310. The I/V amps 301 to 304 each amplify output current signals from the sensors Sa1 to Sa4 and convert the same into voltage signals. The adding circuits 305 to 308 each add the inputted voltage signals. The subtracting circuits 309 and 310 each subtract the inputted added signals. In this way, from the subtracting circuit 309, the signal relating to the spherical aberration (spherical aberration signal) SA is outputted, and from the subtracting circuit 310, the signal relating to the coma aberration (tilt error signal) CM is outputted.

Figure 25:
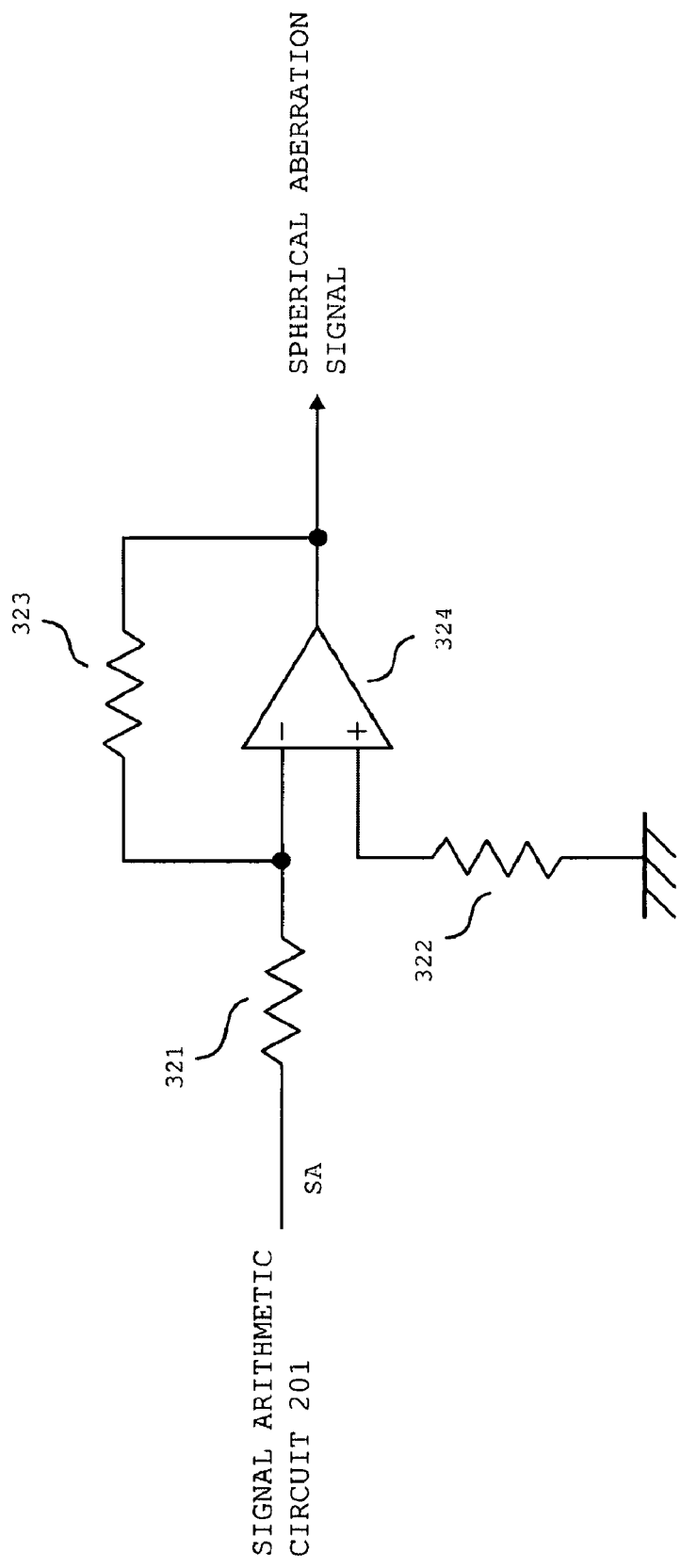
FIG. 25 is a diagram showing a circuit for producing a spherical aberration signal according to the embodiment.

FIG. 25 is a diagram showing a circuit for performing a gain adjustment for servo, on the spherical aberration signal SA. This circuit is disposed within the servo circuit 203. It should be noted that this circuit may be disposed on a side of the signal arithmetic circuit 201. The circuit for performing a gain adjustment for servo is not limited to that which is shown in FIG. 25.

As illustrated in FIG. 25, the gain adjustment circuit is provided with a differential amplifier formed of three resistors 321, 322, and 323 and an operation amp 324. By means of such a differential amplifier, the spherical aberration signal SA is amplified.

Figure 26D:
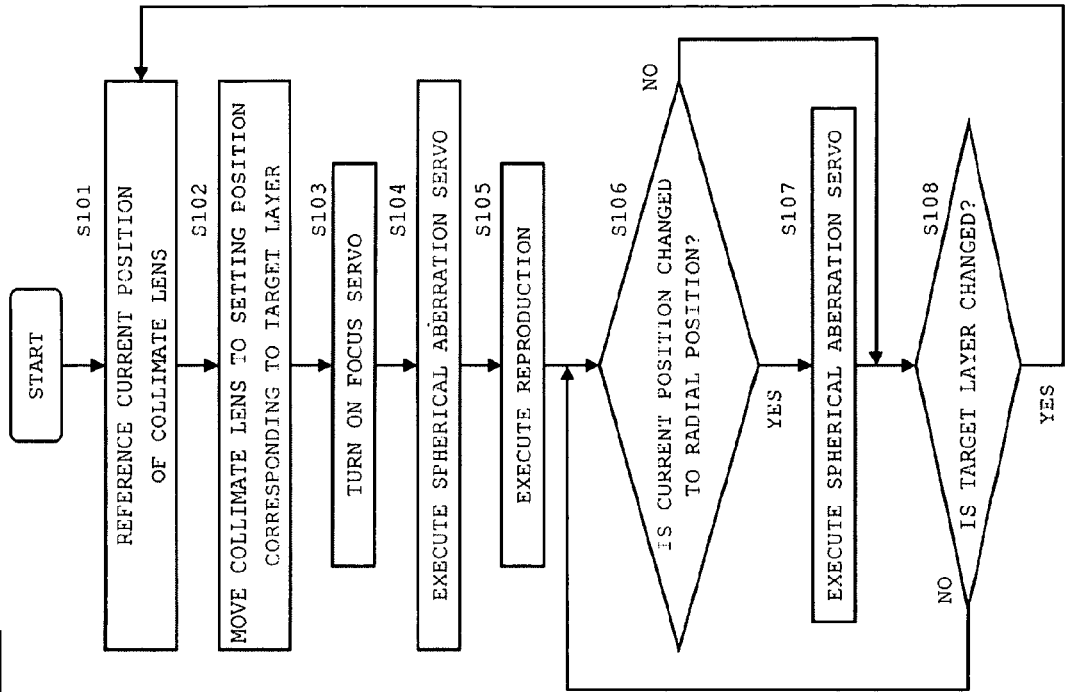
FIG. 26D is a flowchart showing a control operation of the collimate lens according to the embodiment.
Figure 26A:
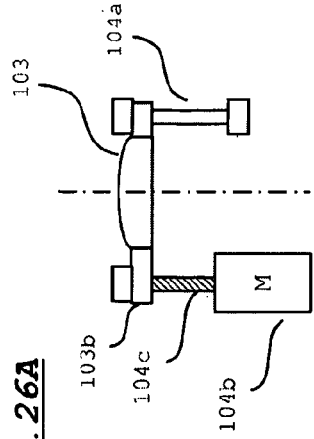
FIG. 26A to FIG. 26C are diagrams schematically showing a flow of drive of a collimate lens according to the embodiment.
Figure 26B:
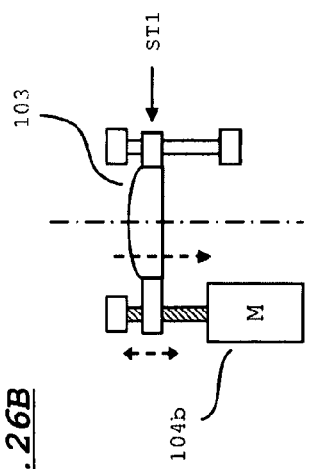
Figure 26C:
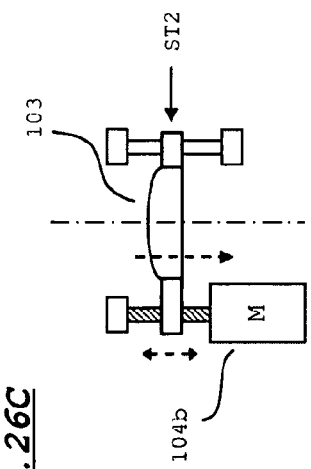

FIG. 26A to FIG. 26D are diagrams for explaining a control operation of the collimate lens 103. FIG. 26A to FIG. 26C are diagrams schematically showing a flow of drive of the collimate lens 103, and FIG. 26D is a flowchart showing the control operation of the collimate lens 103.

As shown in FIG. 26A to FIG. 26C, the lens actuator 104 is provided with a support section 104a for supporting the collimate lens 103 in a manner capable of displacing in an optical axis direction, and a stepping motor 104b for driving the collimate lens 103. The rotation shaft of the stepping motor 104b is attached with a lead screw 104c, and the lead screw 104c is mated with a bearing 103b of the collimate lens 103. When the stepping motor 104b is driven, the collimate lens 103 is stepped relative to an optical axis direction.

With reference to FIG. 26D, the disc 10 is attached to the optical disc apparatus. When a reproducing command is inputted from a user, the servo circuit 203 firstly references a current position of the collimate lens 103 (S101). Subsequently, the servo circuit 203 reads the setting position (step count of the stepping motor) of the collimate lens 103 corresponding to a reproduction-target recording layer (target layer) instructed from the controller 206, from the look-up table 203a, and drives the stepping motor 104b by the step count equivalent to a difference between the read setting position and the current position referenced at step S101 (S102). This positions the collimate lens 103 at a setting position ST1 shown in FIG. 26B, for example.

Thereafter, the servo circuit 203 drives the objective lens actuator 109, performs focus lock-in on the target layer, and starts a focus servo (S103). After a certain interval, the servo circuit 203 performs control for positioning the collimate lens 103 at the most appropriate position (hereinafter, referred to as a "spherical aberration servo"), based on the spherical aberration signal (S104). In this case, the most appropriate position means a position at which the spherical aberration signal comes near zero.

During such a spherical aberration servo, the servo circuit 203 references a polarity and a magnitude of the spherical aberration signal so as to evaluate a step count and a rotation direction (which are needed for positioning the collimate lens 103 at the most appropriate position) of the stepping motor 104b. The servo circuit 203 drives the stepping motor 104 by the step count in the rotation direction.

In this case, the step count may be evaluated by an arithmetic operation. Alternatively, the step count may be read out as follows: a table on which a relation between the magnitude and the step count of the spherical aberration signal is defined is previously held within the servo circuit 203, and from this table, the step count is read out.

In this way, the servo circuit 203 moves the collimate lens 103 toward the most appropriate position. Then, after this movement, the servo circuit 203 again references the polarity and the magnitude of the spherical aberration signal so as to evaluate a step count and a rotation direction (which are needed for positioning the collimate lens 103 at the most appropriate position) of the stepping motor 104b, and moves the collimate lens 103 toward the most appropriate position.

The servo circuit 203 repeats such a servo operation until the spherical aberration signal reaches within a previously set-forth threshold value range near zero. This positions the collimate lens 103 at the most appropriate position. In this way, after the collimate lens 103 is positioned at the most appropriate position, a reproducing operation is executed (S105).

While the reproducing operation is executed, the servo circuit 203 references the address data inputted from the reproducing circuit 202 so as to determine whether the current reproducing position is changed by a predetermined amount in the radial direction from a reproduction starting position (S106). When the determination is NO, the servo circuit 203 determines whether a signal informing that the target layer is changed is inputted from the controller 206 (S108). When the both determinations at step S106 and step S107 are NO, the servo circuit 203 does not execute the spherical aberration servo. Therefore, in a state that the collimate lens 103 is positioned at the position set at step S104, the reproducing operation is advanced.

When the reproducing operation is advanced and the current reproducing position is changed by a predetermined amount in the radial direction from the reproduction starting position (S106: YES), the servo circuit 203 executes the spherical aberration servo (S107). That is, similarly to step S104, the servo circuit 203 moves the collimate lens 103 based on the polarity and the magnitude of the spherical aberration signal, and positions the collimate lens 103 at the most appropriate position.

It is noted that while the spherical aberration servo is executed, the reproducing operation is continued. That is, in the configuration example, as shown in FIG. 22C, based on the signals from the sensors Sa1 to Sa4 disposed separately of the sensors for producing the focus error signal, the tracking error signal, and the reproduced RF signal, the spherical aberration signal is produced independently. This enables the execution of the spherical aberration servo while the reproducing operation is advanced.

When the spherical aberration servo is thus performed, the servo circuit 203 holds the address data inputted from the reproducing circuit 202 upon completion of the servo. Then, the servo circuit 203 compares the address data that is held and the address data inputted as needed at the time of a subsequent reproducing operation so as to determine whether the current reproducing position is changed by a predetermined amount in the radial direction from the reproducing position at which the spherical aberration servo has been previously performed (S106). When it is determined that the current reproducing position is changed by a predetermined amount in the radial direction from the reproducing position at which the spherical aberration servo has been previously performed (S106: YES), the servo circuit 203 executes again the spherical aberration servo (S107).

It is noted that if a jump operation is performed on the same target layer during the reproducing operation, an after-jump reproducing position may change by a predetermined amount in the radial direction from the reproducing position at which the spherical aberration servo has been previously performed (S106: YES). In this case also, the servo circuit 203 executes the spherical aberration servo, similarly to the above-described case, so as to position the collimate lens 103 at the most appropriate position.

When the signal informing that the target layer is changed is inputted from the controller 206 during the reproducing operation (S108: YES), operations after S101 are performed. That is, the servo circuit 203 references the current position of the collimate lens 103 (S101). Then, the servo circuit 203 reads the setting position (step count of the stepping motor) of the collimate lens 103 corresponding to the modified target layer, from the look-up table 203a, and drives the stepping motor 104b by the step count equivalent to a difference between the read setting position and the current position of the collimate lens 103 (S102). This positions the collimate lens 103 at a setting position ST2 shown in FIG. 26C, for example.

Thereafter, the servo circuit 203 drives the objective lens actuator 109, performs focus lock-in on the target layer, and starts the focus servo (S103). After a certain interval, the servo circuit 203 performs the spherical aberration servo so as to position the collimate lens 103 at the most appropriate position (S104). Thereafter, reproduction with respect to the target layer is executed.

As described above, according to the optical disc apparatus according to the configuration, separately of the focus error signal, the tracking error signal, and the reproduced RF signal, the spherical aberration signal is produced independently. This enables the execution of the spherical aberration servo while the reproducing operation is advanced.

According to the optical disc apparatus according to the configuration, based on the spherical aberration signal indicating the generation level of the spherical aberration, the moving amount of the collimate lens 103 is set. Thus, for example, as compared to the case that the position of the collimate lens 103 is so adjusted that jitter or amplitude of the reproduced RF signal is optimized, it is possible to more expeditiously position the collimate lens 103 onto the most appropriate position.

It is noted that in the optical disc apparatus according to the configuration, each time the reproducing position is changed by a predetermined amount in the radial direction, the spherical aberration servo is performed, as described above. The following are reasons why the spherical aberration servo is thus intermittently performed.

Generally, the spherical aberration is generated according to a change in thickness of the cover layer (hereafter, referred to as a "cover thickness") or layer-to-layer interval of the disc 10. Herein, the cover thickness or layer-to-layer interval of the disc does not so greatly change in the disc circumferential direction when the radial position is the same. The cover thickness or layer-to-layer interval of the disc 10 may change along with a change in radial position. This leads to frequent generation of the spherical aberration along with the change in disc radial position. This therefore makes it possible to say that the spherical aberration may be corrected when the irradiation position of the laser light relative to the disc 10 changes in the radial direction to a certain extent. In the above-described case, from this reason, the spherical aberration servo is intermittently performed based on the address data. Besides, the spherical aberration servo may be performed each time a reproducing time elapses by a predetermined time, for example.

It is noted that when the collimate lens 103 or the objective lens 107 is a plastic lens, the spherical aberration is generated due also to a temperature change. According to the optical disc apparatus according to the configuration, even when the spherical aberration is generated due to the temperature change, the spherical aberration is reflected on the spherical aberration signal. As a result, when the collimate lens 103 is thus corrected based on the spherical aberration signal, not only the spherical aberration caused due to the change in cover thickness or layer-to-layer interval but also the spherical aberration based on the temperature change may be corrected. Therefore, according to the optical disc apparatus according to the configuration, it is possible to correct the spherical aberration based on the temperature change without using a separate temperature sensor, etc.

It is noted that in the flowchart in FIG. 26D, after the completion of the focus lock-in for the target layer (S103), the spherical aberration servo is performed (S104). Alternatively, if the spherical aberration signal is sampled at the timing at which the focus error signal becomes "zero" and the collimate lens 103 is moved based on the sampled value, it is possible to perform the spherical aberration servo concurrently with the focus lock-in servo. This enables positioning of the collimate lens 103 at the most appropriate position before the completion of the focus lock-in.

Modified Example of Optical Disc Apparatus

In the flowchart in FIG. 26D, the spherical aberration servo is performed at each time the reproducing position is changed by a predetermined amount in the disc radial direction. However, in this modified example, the spherical aberration servo is performed all the time at the time of reproduction.

Figure 27B:
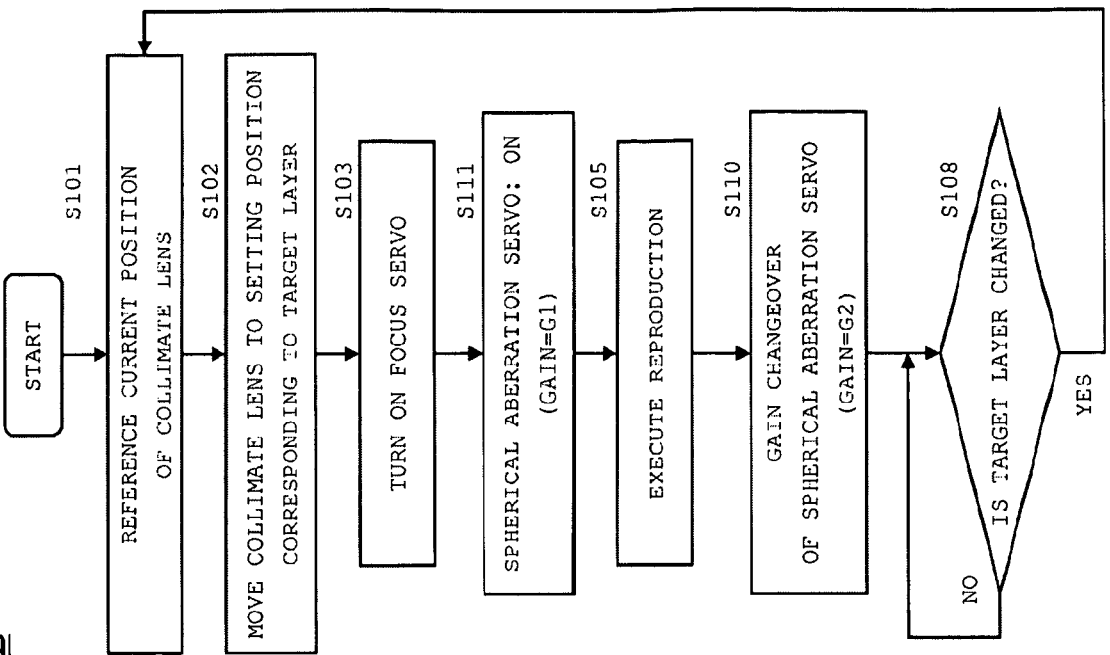
FIG. 27A and FIG. 27B are flowcharts each showing a control operation of a collimate lens according to a modified example of the embodiment.
Figure 27A:
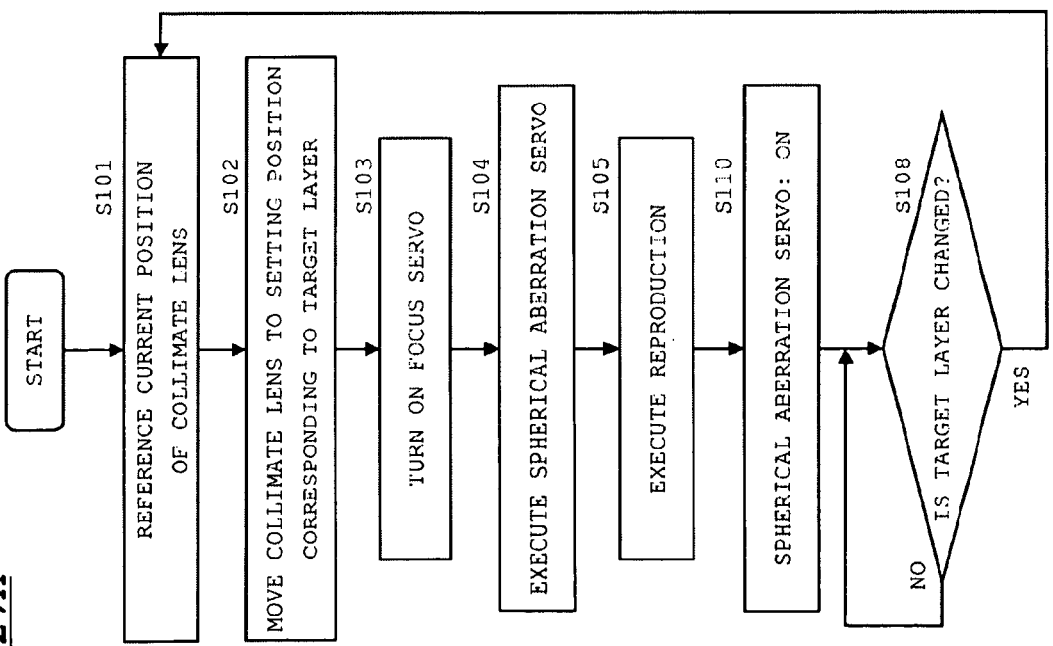

FIG. 27A is a flowchart showing a control operation of the collimate lens 103 according to the modified example. In FIG. 27A, processes at steps S101 to S105 and S108 are the same as those in the flowchart in FIG. 26D.

Figure 28A:
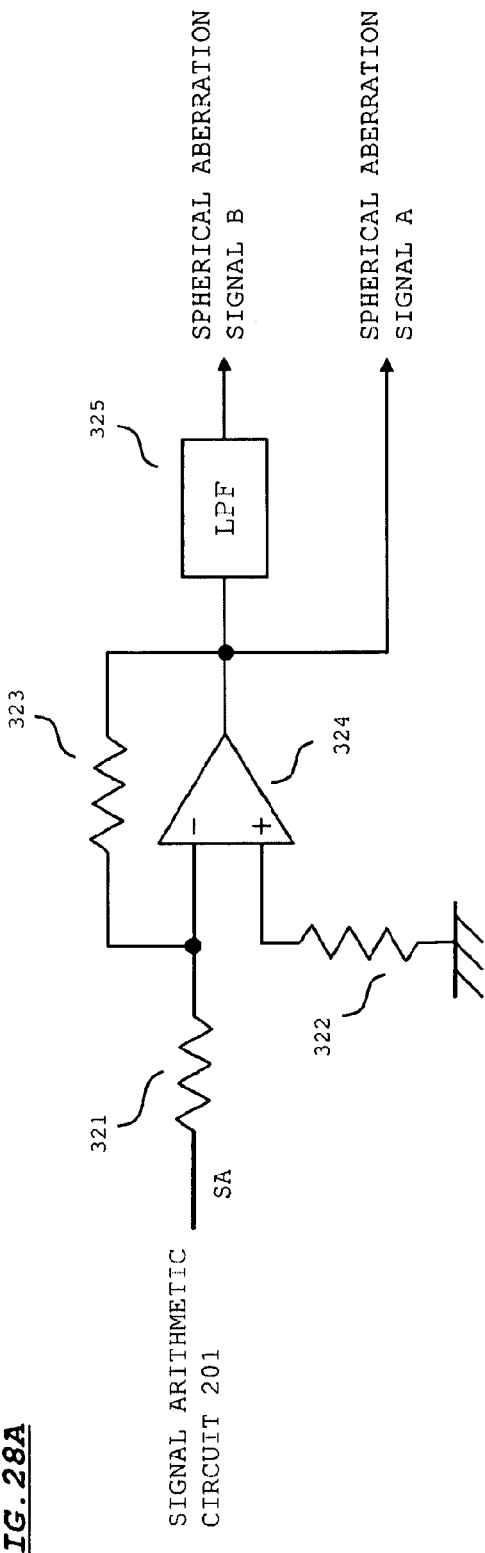
FIG. 28A and FIG. 28B are diagrams showing a circuit for producing a spherical aberration signal according to the modified example of the embodiment.

In the modified example, the circuit in FIG. 25 is modified as that shown in FIG. 28A. In the circuit in FIG. 28A, an LPF (low pass filter) 325 is added to the circuit in FIG. 25. The LPF 325 integrates output from the operation amp 324 so as to produce a spherical aberration signal B. In the circuit in FIG. 28A, two types of spherical aberration signals, i.e., a spherical aberration signal A or output of the operation amp 324 and the spherical aberration signal B or output of the LPF 325, are produced.

At step S104 in FIG. 27A, similarly to the step S104 in FIG. 26D, the spherical aberration servo is performed using the spherical aberration signal A show in FIG. 28A.

In the modified example, after the reproduction is executed at step S105, the spherical aberration servo at step S110 is performed all the time over a reproducing period. In this case, the spherical aberration servo at step S110 differs from the spherical aberration servo at step S104. That is, at step S110, the servo circuit 203 references the spherical aberration signal B in FIG. 28A, and when the spherical aberration signal B exceeds a predetermined threshold value range near zero, moves the collimate lens 103 by a predetermined step count in a direction in which the spherical aberration is suppressed. This operation is repeated until the spherical aberration signal B is pulled in the threshold value range. This positions the collimate lens 103 at the appropriate position during the reproducing period.

The following are the reasons why the servo circuit 203 performs the servo based on the spherical aberration signal B at step S110.

As described above, the spherical aberration is generated according to a change in cover thickness or layer-to-layer interval of the disc 10. Herein, in the disc circumferential direction, the spherical aberration is more sensitive to the influence of axial-runout, etc than to the variation of thickness or layer-to-layer interval. Thus, even when the spherical aberration signal is changed minutely at high frequency along with the movement of the laser light in the circumferential direction, it may be possible to say that the collimate lens 103 needs not to follow this change.

On the other hand, in the optical disc apparatus according to the modified example, as described above, the collimate lens 103 is driven by the stepping motor 104b. When the stepping motor 104b is thus used as a drive source, it is not possible to so highly increase a drive response of the collimate lens 103. In this case, when the stepping motor 104b is applied the servo signal at high frequency, the collimate lens 103 may probably move undesirably rather than correctly following the servo signal. Thus, this makes it possible to say that the stepping motor 104b is desirably servo-controlled at a cycle longer than a disc rotation cycle.

Due to the above-described reasons, in the modified example at step S110, the spherical aberration servo based on the spherical aberration signal B at low frequency outputted from the LPF 325 is performed. The LPF 325 cuts from the SA signal a variance component of the high frequency occurring due to fluttering, etc., during one rotation of the disc, and outputs, as the spherical aberration signal B, a signal that is according to a direct current component (integral value) of the SA signal. Based on the thus-produced spherical aberration signal B, the collimate lens 103 is driven. Thus, even when the stepping motor 104b is used as the drive source as in the modified example, it is possible to appropriately control the collimate lens 103.

Moreover, it is possible to replace the spherical aberration servo at step S104 in FIG. 27A by the spherical aberration servo that is similar to that at step S110 performed during the reproducing period. That is, at step S110, the spherical aberration signal B or output from the LPF 325 is used as the spherical aberration servo, and when the spherical aberration signal B exceeds the predetermined threshold value range near zero, it may be possible to so control that the collimate lens 103 is moved by a predetermined step count in a direction in which the spherical aberration signal B comes near the threshold value range.

However, at step S104, the collimate lens 103 is pulled from the setting position obtained from the look-up table 203a to the most appropriate position, and thus, if such control is performed, it may take a long time to pull the collimate lens 103 to the most appropriate position. Therefore, in this case, it is desirable to take a measure for expediting the spherical aberration servo at step S104.

FIG. 27B is a flowchart when at step S104 in FIG. 27A, the spherical aberration servo similar to that at step S110 is performed. In the flowchart in FIG. 27B, the step S104 in FIG. 27A is replaced by step S111. In this case, the circuit in FIG. 28A is replaced by a circuit in FIG. 28B.

Figure 28B:
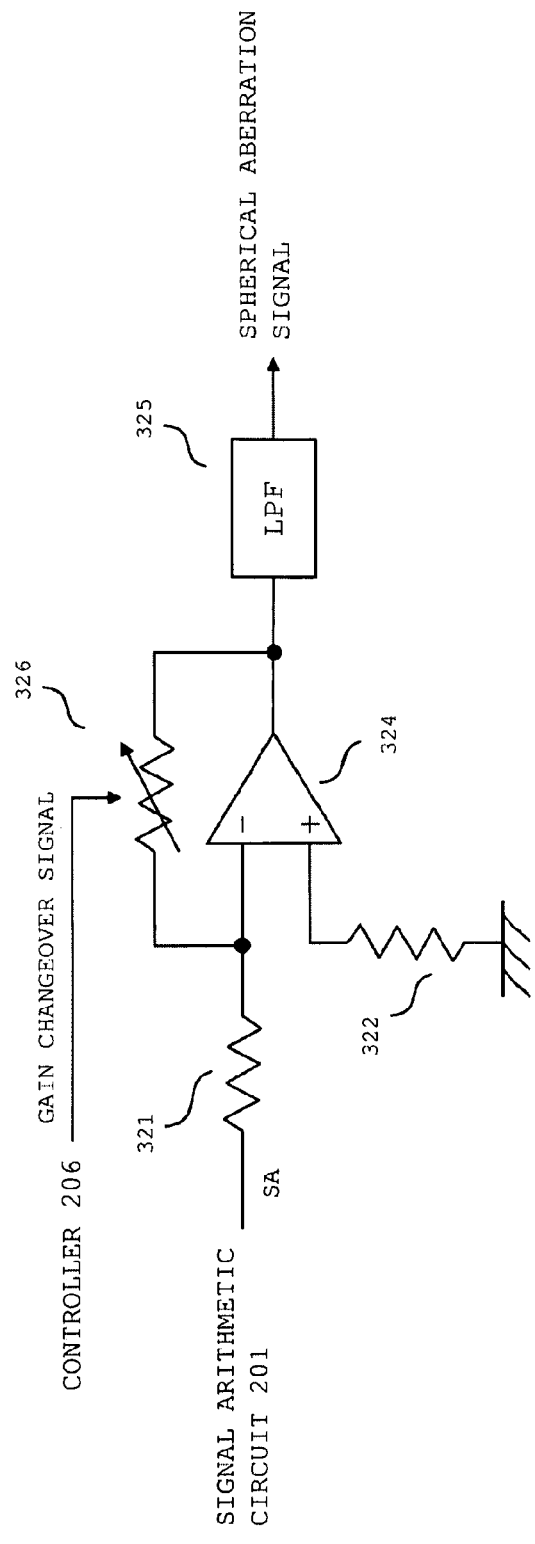

In the circuit in FIG. 28B, a variable resistor is used as a resistor 326, and gain for the differential amplifier is changeable. By way of the circuit, gain (gain=G1) for the differential amplifier at step S111 in FIG. 27B is increased than gain (gain=G2) during the reproducing period at step S112. The servo circuit 203 increases the gain for the differential amplifier by changing the resistance value of the resistance 326 based on a signal (gain changeover signal) inputted from the controller 206 at the time of starting reproducing the disc or at the time of jumping over layers.

Thus, at the time of starting reproduction or at the time of jumping over layers, the gain for the differential amplifier is increased, and thus, a response speed of the spherical aberration servo is increased. Thereby, it becomes possible to expeditiously pull the collimate lens 103 to the most appropriate position. This enables execution of the expedited reproducing operation.

Thus, the configuration example and the modified example of the optical disc apparatus are described. However, the embodiments of the present invention are not limited thereto. For example, there is described the case that the disc 10 has a plurality of recording layers above. However, the present invention may also be applicable to an optical disc apparatus in which an optical disc having a single recording layer is the reproduction target. Moreover, the present invention may also be applicable to an optical disc apparatus that performs not only reproducing but also recording.

It is noted that in the circuit in FIG. 28B, the response speed of the spherical aberration servo is changed by changing the gain for the differential amplifier. However, the response speed of the spherical aberration servo may be changed by changing a time constant of the LPF.

Besides, the embodiment of the present invention may be modified in various ways, where appropriate, within the range of the technological idea set forth in the claims.

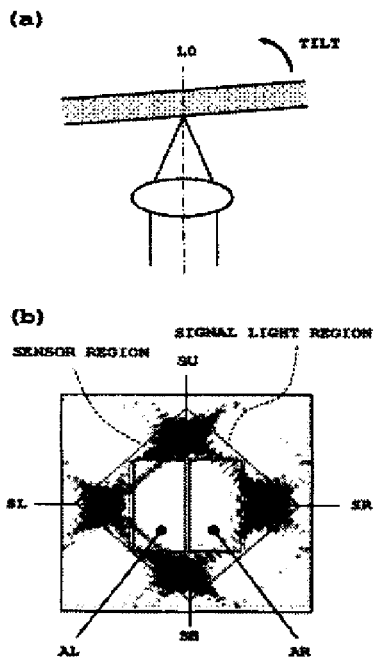 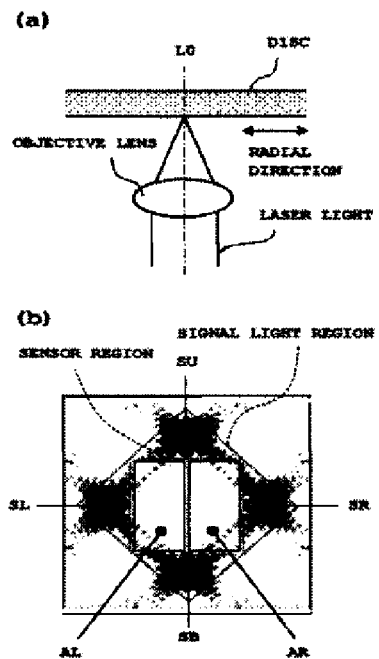 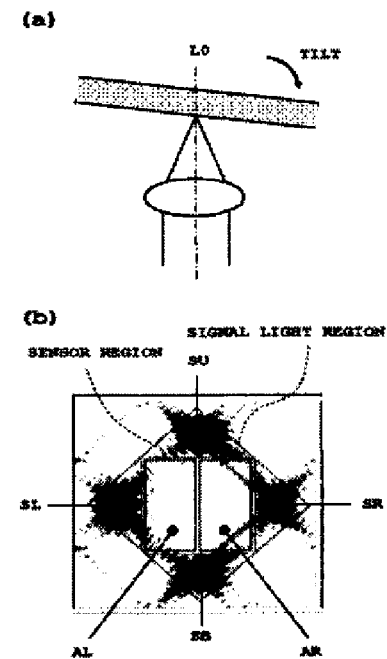

What is claimed is:
1. An optical pickup apparatus, comprising:
 a laser light source;
 an objective lens for converging a laser light emitted from the laser light source onto a recording medium;
 an astigmatic element for introducing an astigmatism into the laser light reflected by the recording medium so as to mutually space a first focal line position occurring by convergence of the laser light in a first direction and a second focal line position occurring by convergence of the laser light in a second direction vertical to the first direction in a propagation direction of the laser light;
 an angle adjusting element for mutually contradicting propagation directions of luminous fluxes, out of the laser light reflected by the recording medium, within four different luminous flux regions so that the luminous fluxes within the four luminous flux regions are mutually dispersed;
 a photodetector for outputting a detection signal when receiving each of the dispersed luminous fluxes; and
 a spherical-aberration correcting unit for correcting a spherical aberration occurring in the laser light; wherein
 when an intersection point of two mutually crossing straight lines respectively parallel to the first direction and the second direction is matched to an optical axis of the laser light, the angle adjusting element sets the four luminous flux regions so that two of the luminous flux regions are placed in a direction in which a set of opposite angles made by the two straight lines are aligned and remaining two luminous flux regions are placed in a direction in which an alternate set of opposite angles are aligned, and
 the photodetector includes first sensor section for receiving the four luminous fluxes individually and second sensor section for detecting a change of an intensity distribution of the luminous fluxes by the spherical aberration.

2. The optical pickup apparatus according to claim 1, wherein
 the four luminous flux regions are set by splitting a luminous flux region of the laser light by the two straight lines.

3. The optical pickup apparatus according to claim 1, wherein
 the angle adjusting element changes propagation directions of the four luminous flux regions so that each of the dispersed luminous fluxes is respectively guided to four different apical positions forming a square on a light receiving surface of the photodetector.

4. The optical pickup apparatus according to claim 3, wherein
 the second sensor section include two sensors disposed in line with two mutually opposed sides of the square and two sensors disposed in line with the two remaining sides.

5. The optical pickup apparatus according to claim 4, comprising a first arithmetic circuit for performing an arithmetic operation to obtain a difference between a detection signal corresponding to a total amount of light received in the two sensors disposed in line with two mutually opposed sides of the square and a detection signal corresponding to a total amount of received light on the two sensors disposed in line with the two remaining sides.

6. The optical pickup apparatus according to claim 4, wherein
each light receiving region of the four sensors configuring the second sensor section is a region formed by splitting a region surrounded by the first sensor section into four regions by a straight line connecting two mutually opposed apical points on the square and a straight line connecting the two remaining apical points.

7. The optical pickup apparatus according to claim 6, comprising a second arithmetic circuit for performing an arithmetic operation to obtain a difference between a detection signal corresponding to a total amount of light received in one sensor group and a detection signal corresponding to a total amount of light received in an alternate sensor group, when the four sensors are divided into two groups by one straight line connecting two mutually opposed apical points on the square.

8. A focal-point adjusting method for positioning a focal point position of an irradiation light on a target surface, comprising:
introducing an astigmatism into the irradiation light reflected by the target surface so that a first focal line position occurring by convergence of the irradiation light in a first direction and a second focal line position occurring by convergence of the irradiation light in a second direction vertical to the first direction are mutually spaced in a propagation direction of the irradiation light;
mutually contradicting propagation directions of luminous fluxes, out of the irradiation light reflected by the target surface, within four different luminous flux regions so that the luminous fluxes within the four luminous flux regions are mutually dispersed; and
receiving each of the dispersed luminous fluxes in a photodetector, wherein
when an intersection point of two mutually crossing straight lines respectively parallel to the first direction and the second direction is matched to an optical axis of the irradiation light, the four luminous flux regions are so set that two of the luminous flux regions are placed in a direction in which a set of opposite angles made by the two straight lines are aligned and remaining two luminous flux regions are placed in a direction in which an alternate set of opposite angles are aligned, and
the photodetector includes first sensor section for receiving the four luminous fluxes individually and second sensor section for detecting a change of an intensity distribution of the luminous fluxes by the spherical aberration, whereby
an arithmetic process based on an astigmatic method is performed on a detection signal outputted from the first sensor section so as to produce a focus error signal, and
a signal expressing a spherical aberration is produced based on a detection signal outputted from the second sensor section.

9. An optical disc apparatus, comprising:
an optical pickup apparatus;
an arithmetic circuit; and
a servo circuit,
the optical pickup apparatus, further comprising:
a laser light source;
an objective lens for converging a laser light emitted from the laser light source onto an optical disc;
an astigmatic element for introducing an astigmatism into the laser light reflected by the optical disc so as to mutually space a first focal line position occurring by convergence of the laser light in a first direction and a second focal line position occurring by convergence of the laser light in a second direction vertical to the first direction in a propagation direction of the laser light;
an angle adjusting element for mutually contradicting propagation directions of luminous fluxes, out of the laser light reflected by the optical disc, within four different luminous flux regions so that the luminous fluxes within the four luminous flux regions are mutually dispersed;
a photodetector for outputting a detection signal when receiving each of the dispersed luminous fluxes; and
a spherical-aberration correcting unit for correcting a spherical aberration occurring in the laser light, wherein
when an intersection point of two mutually crossing straight lines respectively parallel to the first direction and the second direction is matched to an optical axis of the laser light, the angle adjusting element sets the four luminous flux regions so that two of the luminous flux regions are placed in a direction in which a set of opposite angles made by the two straight lines are aligned and remaining two luminous flux regions are placed in a direction in which an alternate set of opposite angles are aligned, and
the photodetector includes first sensor section for receiving the four luminous fluxes individually and second sensor section for detecting a change of an intensity distribution of the luminous fluxes by the spherical aberration,
the arithmetic circuit performs an arithmetic process on a signal from the photodetector, and
the servo circuit drives and controls the objective lens and the spherical-aberration correcting unit based on a signal from the arithmetic circuit.

10. The optical disc apparatus according to claim 9, wherein
the angle adjusting element changes propagation directions of the four luminous flux regions so that each of the dispersed luminous fluxes is respectively guided to four different apical positions forming a square on a light receiving surface of the photodetector.

11. The optical disc apparatus according to claim 10, wherein
the second sensor section include two sensors disposed in line with two mutually opposed sides of the square and two sensors disposed in line with the two remaining sides.

12. The optical disc apparatus according to claim 11, wherein
the arithmetic circuit comprises a first arithmetic circuit for performing an arithmetic operation to obtain a difference between a detection signal corresponding to a total amount of light received in the two sensors disposed in line with two mutually opposed sides of the square and a detection signal corresponding to a total amount of received light on the two sensors disposed in line with the two remaining sides, and
the servo circuit controls the spherical-aberration correcting unit based on an arithmetic result by first arithmetic circuit.

13. The optical disc apparatus according to claim 11, wherein
  each light receiving region of the four sensors configuring the second sensor section is a region formed by splitting a region surrounded by the first sensor section into four regions by a straight line connecting two mutually opposed apical points on the square and a straight line connecting the two remaining apical points.

14. The optical disc apparatus according to claim 13, further comprising a coma-aberration correcting unit for correcting a coma aberration occurring in the laser light, wherein
  the arithmetic circuit comprises a second arithmetic circuit for performing an arithmetic operation to obtain a difference between a detection signal corresponding to a total amount of light received in one sensor group and a detection signal corresponding to a total amount of light received in an alternate sensor group, when the four sensors are divided into two groups by one straight line connecting two mutually opposed apical points on the square, and
  the servo circuit drives and controls the coma-aberration correcting unit based on an arithmetic result by the second arithmetic circuit.

15. The optical disc apparatus according to claim 9, wherein
  the servo circuit controls the spherical aberration correcting unit, concurrently with reproducing or recording the optical disc.

16. The optical disc apparatus according to claim 9, wherein
  the servo circuit controls the spherical aberration correcting unit each time an irradiation position of the laser light relative to the optical disc is changed by a predetermined amount in a radial direction of the optical disc.

17. The optical disc apparatus according to claim 9, wherein
  the arithmetic circuit produces an aberration signal according to the spherical aberration, based on an output signal from the second sensor section,
  the optical disc apparatus further comprises a low pass filter to which the aberration signal is inputted, and
  the servo circuit controls the spherical aberration correcting unit based on output from the low pass filter.

18. The optical disc apparatus according to claim 17, wherein
  the optical disc includes a plurality of recording layers in a stacking direction,
  the optical disc apparatus further comprises a circuit section for changing a time constant of the low pass filter, and
  when an irradiation target of the laser light is changed over from a first recording layer to a second recording layer, a response speed of the servo circuit is increased.

* * * * *

UNITED STATES PATENT AND TRADEMARK OFFICE
CERTIFICATE OF CORRECTION

PATENT NO. : 7,990,835 B2
APPLICATION NO. : 12/512440
DATED : August 2, 2011
INVENTOR(S) : Kenji Nagatomi, Katsutoshi Hibino and Seiichiro Takahashi It is certified that error appears in the above-identified patent and that said Letters Patent is hereby corrected as shown below:

In the drawings, FIGS. 11A-11C, the extraneous lines at top and bottom of FIG. 11A should be removed, the extraneous lines at top, bottom, left, and right of FIG. 11B should be removed, and the extraneous lines at top and right of FIG. 11C should be removed:

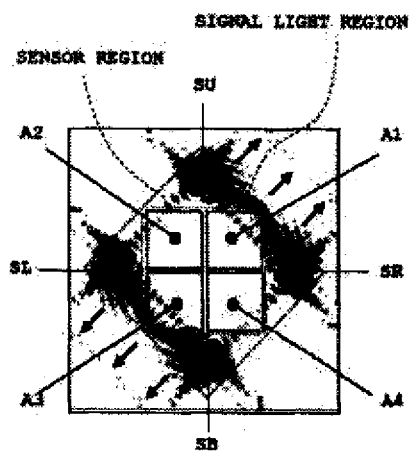 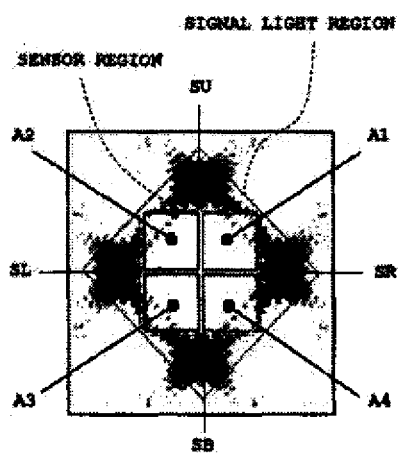 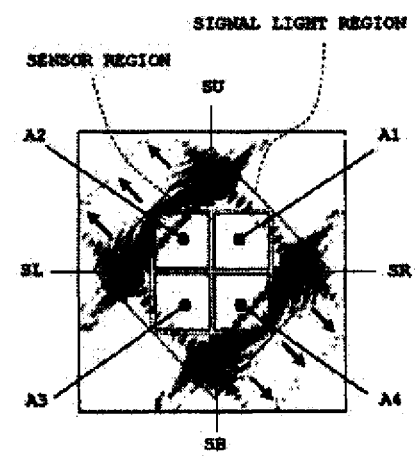

Signed and Sealed this
Fourth Day of December, 2012

David J. Kappos
*Director of the United States Patent and Trademark Office*

CERTIFICATE OF CORRECTION (continued)

U.S. Pat. No. 7,990,835 B2

In the drawings, FIG. 12, the boxes on upper and lower ends of the "DISC" should be removed:

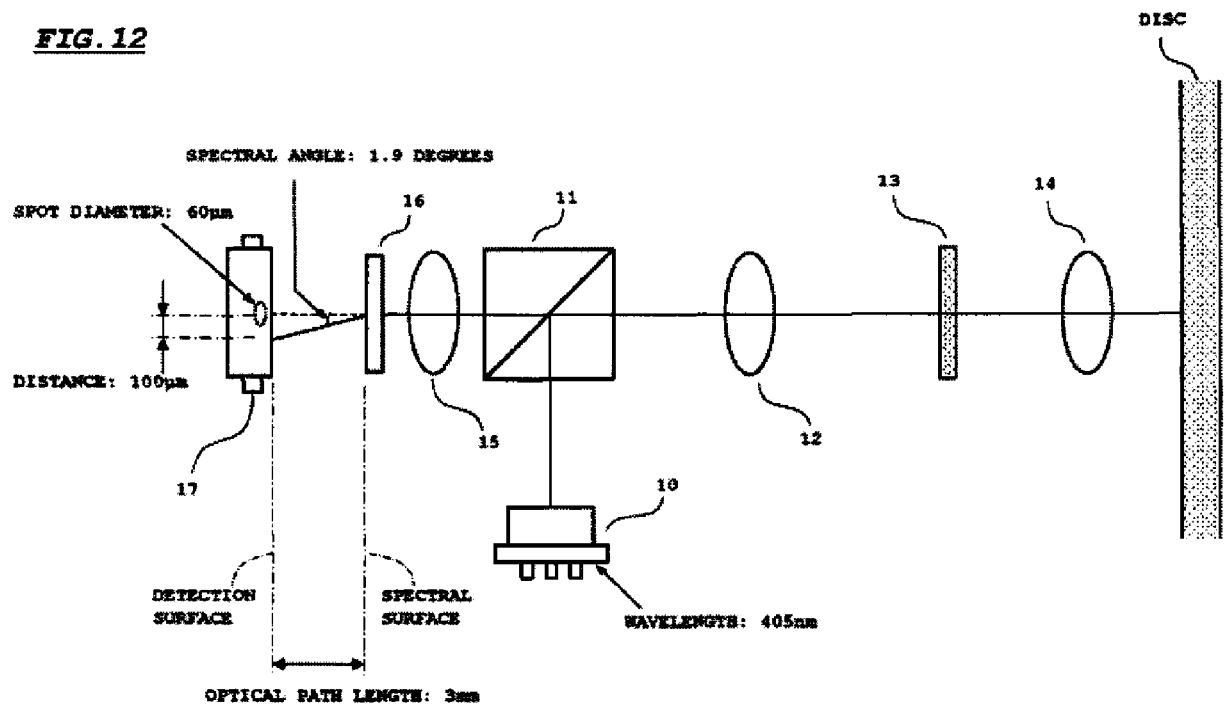

In the drawings, FIG. 21A-21C, the boxes on left and right ends of the "DISC" and the boxes on the lower end of the "LASER LIGHT" in each of FIGS. 21A(a), 21B(a), and 21C(a) should be removed; and the extraneous lines at top and bottom of FIG. 21A(b), the extraneous lines at top and bottom of FIG. 21B(b), and extraneous lines at top and right of FIG. 21C(b) should be removed: